United States Patent
Topolkaraev et al.

(10) Patent No.: US 10,753,023 B2
(45) Date of Patent: Aug. 25, 2020

(54) TOUGHENED POLYLACTIC ACID FIBERS

(75) Inventors: Vasily A. Topolkaraev, Appleton, WI (US); Peiguang Zhou, Appleton, WI (US); Gregory J. Wideman, Menasha, WI (US); Tom Eby, Greenville, WI (US); Ryan J. McEneany, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 758 days.

(21) Appl. No.: 12/855,984

(22) Filed: Aug. 13, 2010

(65) Prior Publication Data
US 2012/0040185 A1 Feb. 16, 2012

(51) Int. Cl.
*D04H 3/009* (2012.01)
*D01F 6/92* (2006.01)
(Continued)

(52) U.S. Cl.
CPC .............. *D04H 3/009* (2013.01); *C08L 67/04* (2013.01); *D01F 6/625* (2013.01); *D01F 6/92* (2013.01);
(Continued)

(58) Field of Classification Search
None
See application file for complete search history.

(56) References Cited

U.S. PATENT DOCUMENTS

| 3,338,992 A | 8/1967 | Kinney |
| 3,341,394 A | 9/1967 | Kinney |

(Continued)

FOREIGN PATENT DOCUMENTS

| EP | 1054085 A1 | 11/2000 |
| EP | 1579048 B1 | 7/2001 |

(Continued)

OTHER PUBLICATIONS

ASTM D 1238-04—Standard Test Method for Melt Flow Rates of Thermoplastics by Extrusion Plastometer, Current edition approved Dec. 1, 2004, pp. 1-14.

(Continued)

*Primary Examiner* — Chinessa T. Golden
(74) *Attorney, Agent, or Firm* — Dority & Manning, P.A.

(57) ABSTRACT

Polylactic acid fibers formed from a thermoplastic composition that contains polylactic acid and a polymeric toughening additive are provided. The present inventors have discovered that the specific nature of the components and process by which they are blended may be carefully controlled to achieve a composition having desirable morphological features. More particularly, the toughening additive can be dispersed as discrete physical domains within a continuous phase of the polylactic acid. These domains have a particular size, shape, and distribution such that upon fiber drawing, they absorb energy and become elongated. This allows the resulting composition to exhibit a more pliable and softer behavior than the otherwise rigid polylactic acid. Through selective control over the components and method employed, the present inventors have discovered that the resulting fibers may thus exhibit good mechanical properties, both during and after melt spinning.

30 Claims, 5 Drawing Sheets

(51) Int. Cl.
*D01F 6/62* (2006.01)
*C08L 67/04* (2006.01)
*B29K 105/00* (2006.01)
*B29K 67/00* (2006.01)

(52) U.S. Cl.
CPC .. *B29K 2067/043* (2013.01); *B29K 2067/046* (2013.01); *B29K 2105/0088* (2013.01); *B29K 2995/006* (2013.01); *Y10T 428/26* (2015.01); *Y10T 428/298* (2015.01); *Y10T 442/626* (2015.04)

(56) References Cited

U.S. PATENT DOCUMENTS

| | | | |
|---|---|---|---|
| 3,423,255 A | 1/1969 | Joyce | |
| 3,502,538 A | 3/1970 | Petersen | |
| 3,502,763 A | 3/1970 | Hartmann | |
| 3,542,615 A | 11/1970 | Dobo et al. | |
| 3,692,618 A | 9/1972 | Dorschner et al. | |
| 3,802,817 A | 4/1974 | Matsuki et al. | |
| 3,849,241 A | 11/1974 | Butin et al. | |
| 3,855,046 A | 12/1974 | Hansen et al. | |
| 4,041,203 A | 8/1977 | Brock et al. | |
| 4,055,702 A | 10/1977 | Guthrie et al. | |
| 4,100,324 A | 7/1978 | Anderson et al. | |
| 4,215,682 A | 8/1980 | Kubik et al. | |
| 4,307,143 A | 12/1981 | Meitner | |
| 4,340,563 A | 7/1982 | Appel et al. | |
| 4,374,888 A | 2/1983 | Bornslaeger | |
| 4,375,718 A | 3/1983 | Wadsworth et al. | |
| 4,592,815 A | 6/1986 | Nakao | |
| 4,698,372 A | 10/1987 | Moss | |
| 4,707,398 A | 11/1987 | Boggs | |
| 4,766,029 A | 8/1988 | Brock et al. | |
| 4,789,592 A | 12/1988 | Taniguchi et al. | |
| 4,795,668 A | 1/1989 | Krueger et al. | |
| 4,797,468 A | 1/1989 | De Vries | |
| 4,874,659 A | 10/1989 | Ando et al. | |
| 4,937,299 A | 6/1990 | Ewen et al. | |
| D315,990 S | 4/1991 | Blenke et al. | |
| 5,057,368 A | 10/1991 | Largman et al. | |
| 5,069,970 A | 12/1991 | Largman et al. | |
| 5,084,334 A | 1/1992 | Hamano et al. | |
| 5,108,820 A | 4/1992 | Kaneko et al. | |
| 5,162,074 A | 11/1992 | Hills | |
| 5,169,706 A | 12/1992 | Collier, IV et al. | |
| 5,179,164 A | 1/1993 | Lausberg et al. | |
| 5,213,881 A | 5/1993 | Timmons et al. | |
| 5,218,071 A | 6/1993 | Tsutsui et al. | |
| 5,252,642 A * | 10/1993 | Sinclair et al. | 524/108 |
| 5,266,610 A | 11/1993 | Malhotra et al. | |
| 5,272,236 A | 12/1993 | Lai et al. | |
| 5,277,976 A | 1/1994 | Hogle et al. | |
| 5,278,272 A | 1/1994 | Lai et al. | |
| 5,279,976 A | 1/1994 | Hayden et al. | |
| 5,284,703 A | 2/1994 | Everhart et al. | |
| 5,294,482 A | 3/1994 | Gessner | |
| 5,317,059 A | 5/1994 | Chundury et al. | |
| 5,322,728 A | 6/1994 | Davey et al. | |
| 5,336,552 A | 8/1994 | Strack et al. | |
| 5,350,624 A | 9/1994 | Georger et al. | |
| 5,382,400 A | 1/1995 | Pike et al. | |
| 5,401,446 A | 3/1995 | Tsai et al. | |
| D358,035 S | 5/1995 | Zander et al. | |
| 5,422,377 A | 6/1995 | Aubert | |
| 5,464,688 A | 11/1995 | Timmons et al. | |
| 5,466,410 A | 11/1995 | Hills | |
| 5,470,944 A | 11/1995 | Bonsignore | |
| 5,472,775 A | 12/1995 | Obijeski et al. | |
| 5,502,158 A | 3/1996 | Sinclair et al. | |
| 5,539,056 A | 7/1996 | Yang et al. | |
| 5,571,619 A | 11/1996 | McAlpin et al. | |
| 5,596,052 A | 1/1997 | Resconi et al. | |
| 5,620,779 A | 4/1997 | Levy et al. | |
| D384,508 S | 10/1997 | Zander et al. | |
| D384,819 S | 10/1997 | Zander et al. | |
| 5,686,531 A | 11/1997 | Engelke et al. | |
| D390,708 S | 2/1998 | Brown | |
| 5,714,573 A | 2/1998 | Randall et al. | |
| 5,770,682 A | 6/1998 | Ohara et al. | |
| 5,807,490 A | 9/1998 | Davis et al. | |
| 5,821,327 A | 10/1998 | Oota et al. | |
| 5,880,254 A | 3/1999 | Ohara et al. | |
| 5,883,026 A | 3/1999 | Reader et al. | |
| 5,883,199 A | 3/1999 | McCarthy et al. | |
| 5,908,598 A | 6/1999 | Rousseau et al. | |
| 5,962,112 A | 10/1999 | Haynes et al. | |
| D418,305 S | 1/2000 | Zander et al. | |
| D428,267 S | 7/2000 | Romano, III et al. | |
| 6,090,325 A | 7/2000 | Wheat et al. | |
| 6,093,665 A | 7/2000 | Sayovitz et al. | |
| 6,117,928 A | 9/2000 | Hiltunen et al. | |
| 6,153,138 A | 11/2000 | Helms, Jr. et al. | |
| 6,197,237 B1 | 3/2001 | Tsai et al. | |
| 6,200,669 B1 | 3/2001 | Marmon et al. | |
| 6,235,825 B1 | 5/2001 | Yoshida et al. | |
| 6,291,597 B1 | 9/2001 | Gruber et al. | |
| 6,309,988 B1 | 10/2001 | Tsai et al. | |
| 6,326,458 B1 | 12/2001 | Gruber et al. | |
| 6,365,088 B1 | 4/2002 | Knight et al. | |
| 6,372,846 B1 | 4/2002 | McGrail et al. | |
| 6,500,563 B1 | 12/2002 | Datta et al. | |
| 6,509,092 B1 | 1/2003 | Dugan | |
| 6,660,211 B2 | 12/2003 | Topolkaraev et al. | |
| 6,713,175 B1 | 3/2004 | Terada et al. | |
| 6,756,331 B2 | 6/2004 | Kasemura et al. | |
| 6,811,874 B2 | 11/2004 | Tanaka et al. | |
| 6,815,475 B2 | 11/2004 | Donald et al. | |
| 6,838,403 B2 | 1/2005 | Tsai et al. | |
| 6,869,985 B2 | 3/2005 | Mohanty et al. | |
| 6,905,759 B2 | 6/2005 | Topolkaraev et al. | |
| 6,949,288 B2 | 9/2005 | Hodge et al. | |
| 7,135,523 B2 | 11/2006 | Ho et al. | |
| 7,256,223 B2 | 8/2007 | Mohanty et al. | |
| 7,273,894 B2 | 9/2007 | Shelby et al. | |
| 7,354,973 B2 | 4/2008 | Flexman | |
| 7,368,503 B2 | 5/2008 | Hale | |
| 7,393,590 B2 | 7/2008 | Scheer et al. | |
| 7,566,753 B2 | 7/2009 | Randall et al. | |
| 7,632,544 B2 | 12/2009 | Ho et al. | |
| 7,863,382 B2 | 1/2011 | Ishii et al. | |
| 7,872,056 B2 | 1/2011 | Cheung et al. | |
| 7,977,397 B2 | 7/2011 | Cheung et al. | |
| 7,994,078 B2 | 8/2011 | Reichmann et al. | |
| 8,022,139 B2 | 9/2011 | Kurihara et al. | |
| 8,026,309 B2 | 9/2011 | Halahmi et al. | |
| 8,030,382 B2 | 10/2011 | Endo et al. | |
| 8,044,134 B2 | 10/2011 | Chung et al. | |
| 8,075,994 B2 | 12/2011 | Sakamoto et al. | |
| 8,076,406 B2 | 12/2011 | Brule et al. | |
| 8,188,188 B2 | 5/2012 | Kobayashi et al. | |
| 8,236,893 B2 | 8/2012 | Nakagawa et al. | |
| 8,268,738 B2 | 9/2012 | McEneany et al. | |
| 8,268,913 B2 | 9/2012 | Li et al. | |
| 8,334,327 B2 | 12/2012 | Kaufman et al. | |
| 8,362,145 B2 | 1/2013 | Li et al. | |
| 8,372,917 B2 | 2/2013 | Li et al. | |
| 8,410,215 B2 | 4/2013 | Sano et al. | |
| 8,415,008 B2 | 4/2013 | Ito et al. | |
| 8,420,193 B2 | 4/2013 | Hiruma et al. | |
| 8,444,905 B2 | 5/2013 | Li et al. | |
| 8,709,591 B2 | 4/2014 | Sumi et al. | |
| 9,206,311 B2 | 12/2015 | Steinke et al. | |
| 2002/0081423 A1 | 6/2002 | Heffelfinger et al. | |
| 2003/0039775 A1 | 2/2003 | Kong | |
| 2004/0002273 A1 | 1/2004 | Fitting et al. | |
| 2004/0038028 A1 * | 2/2004 | Tanaka et al. | 428/373 |
| 2004/0077792 A1 | 4/2004 | Qiao et al. | |
| 2004/0248486 A1 * | 12/2004 | Hodson | B32B 27/04 442/79 |
| 2005/0112363 A1 | 5/2005 | Ning | |
| 2006/0263394 A1 | 11/2006 | Oyama et al. | |
| 2007/0155906 A1 | 7/2007 | Hissink et al. | |
| 2007/0182041 A1 | 8/2007 | Rizk et al. | |

(56) References Cited

U.S. PATENT DOCUMENTS

| | | | |
|---|---|---|---|
| 2008/0042312 A1 | 2/2008 | Chen et al. | |
| 2008/0095978 A1* | 4/2008 | Siqueira et al. | 428/137 |
| 2008/0147165 A1 | 6/2008 | Hossainy et al. | |
| 2008/0287026 A1* | 11/2008 | Chakravarty et al. | 442/414 |
| 2008/0311814 A1 | 12/2008 | O'Sickey et al. | |
| 2009/0008816 A1 | 1/2009 | Takita et al. | |
| 2009/0060860 A1 | 3/2009 | Almenar et al. | |
| 2009/0068463 A1 | 3/2009 | Mochizuki et al. | |
| 2009/0069463 A1 | 3/2009 | Serizawa et al. | |
| 2009/0124723 A1 | 5/2009 | Hogt et al. | |
| 2009/0124956 A1 | 5/2009 | Swetlin et al. | |
| 2009/0197041 A1* | 8/2009 | Lake et al. | 428/132 |
| 2009/0236309 A1 | 9/2009 | Millward et al. | |
| 2009/0239086 A1 | 9/2009 | Ishizuka et al. | |
| 2009/0246155 A1 | 10/2009 | Bitler et al. | |
| 2009/0274871 A1 | 11/2009 | Takahashi et al. | |
| 2009/0311937 A1 | 12/2009 | He et al. | |
| 2009/0324911 A1 | 12/2009 | Li et al. | |
| 2009/0326152 A1 | 12/2009 | Li et al. | |
| 2010/0028657 A1 | 2/2010 | Ito et al. | |
| 2010/0048082 A1 | 2/2010 | Topolkaraev et al. | |
| 2010/0068471 A1 | 3/2010 | Lubart et al. | |
| 2010/0092754 A1 | 4/2010 | Nishida et al. | |
| 2010/0112357 A1 | 5/2010 | Fine et al. | |
| 2010/0143717 A1* | 6/2010 | Sakamoto et al. | 428/373 |
| 2010/0233458 A1 | 9/2010 | Sun et al. | |
| 2011/0028062 A1 | 2/2011 | Chester et al. | |
| 2011/0046281 A1 | 2/2011 | Scheer et al. | |
| 2011/0065573 A1 | 3/2011 | Mceneany et al. | |
| 2011/0132519 A1 | 6/2011 | Li et al. | |
| 2011/0244273 A1 | 6/2011 | Li et al. | |
| 2011/0190447 A1 | 8/2011 | Li et al. | |
| 2011/0195210 A1 | 8/2011 | Li et al. | |
| 2011/0245420 A1 | 10/2011 | Rasal et al. | |
| 2011/0251346 A1 | 10/2011 | Li et al. | |
| 2011/0256346 A1 | 10/2011 | Bowden et al. | |
| 2012/0040582 A1 | 2/2012 | Topolkaraev et al. | |
| 2012/0231242 A1 | 9/2012 | Boyer et al. | |
| 2013/0228529 A1 | 9/2013 | Guo et al. | |
| 2014/0044954 A1 | 2/2014 | Matsubara et al. | |

FOREIGN PATENT DOCUMENTS

| | | |
|---|---|---|
| EP | 1361039 A1 | 11/2003 |
| EP | 1725614 B1 | 8/2008 |
| GB | 1385105 | 2/1975 |
| JP | 2003238775 | 8/2003 |
| JP | 2008069345 | 3/2008 |
| KR | 20080072740 A | 8/2008 |
| KR | 20090024709 A | 3/2009 |
| KR | 20090034199 A | 4/2009 |
| WO | WO 01/14621 A1 | 3/2001 |
| WO | WO 0134886 A1 | 5/2001 |
| WO | WO 03066704 A1 | 8/2003 |
| WO | WO 2007092417 A1 | 8/2007 |
| WO | WO 2007115081 A2 | 10/2007 |
| WO | WO 2007115081 A3 | 10/2007 |
| WO | WO 2008015232 A1 | 2/2008 |
| WO | WO 2008020726 A1 | 2/2008 |
| WO | WO 2008030599 A2 | 3/2008 |
| WO | WO 2008030599 A3 | 3/2008 |
| WO | WO 2008079784 A2 | 7/2008 |
| WO | WO 2008079784 A3 | 7/2008 |
| WO | WO 2009/012284 A1 | 1/2009 |
| WO | WO 2009145778 A1 | 12/2009 |
| WO | WO 2009151437 A1 | 12/2009 |
| WO | WO 2009151439 A1 | 12/2009 |
| WO | WO 2010000669 A1 | 1/2010 |
| WO | WO 2011/084670 A1 | 7/2011 |
| WO | WO 2011080623 A2 | 7/2011 |
| WO | WO 2011080623 A3 | 7/2011 |
| WO | WO2013066487 | 5/2013 |

OTHER PUBLICATIONS

ASTM D 1239-92—Standard Test Method for Resistance of Plastic Films to Extraction by Chemicals, Current edition approved Aug. 15, 1992, pp. 281-282.

ASTM D 3418-03 (Formerly D 3417-99)—Standard Test Method for Enthalpies of Fusion and Crystallization of Polymers by Differential Scanning Calorimetry (DSC), Current edition approved Dec. 1, 2003, pp. 65-72.

ASTM D 5338-92—Standard Test Method for Determining Aerobic Biodegradation of Plastic Materials Under Controlled Composting Conditions, Current edition approved Dec. 15, 1992, pp. 456-461.

ASTM D 7191-05—Standard Test Method for Determination of Moisture in Plastics by Relative Humidity Sensor, Current edition approved Nov. 1, 2005, pp. 1-4.

Balakrishnan et al., "Novel toughened polylactic acid nanocomposite: Mechanical, thermal and morphological properties," *Materials and Design*, vol. 31, 2010, pp. 3289-3298.

Chalamet et al., "Carboxyl Terminated Polyamide 12 Chain Extension by Reactive Extrusion Using a Dioxazoline Coupling Agent. Part I: Extrusion Parameters Analysis," *Polymer Engineering and Science*, vol. 40, No. 1, Jan. 2000, pp. 263-274.

Chalamet et al., "Carboxyl Terminated Polyamide 12 Chain Extension by Reactive Extrusion Using a Dioxazoline Coupling Agent. Part II: Effects of Extrusion Conditions," *Polymer Engineering and Science*, vol. 42, No. 12, Dec. 2002, pp. 2317-2327.

Japon et al., "Reactive processing of poly(ethylene terephthalate) modified with multifunctional epoxy-based additives," *Polymer*, vol. 41, 2000, pp. 5809-5818.

Oyama, Hideko T., "Super-tough poly(lactic acid) materials: Reactive blending with ethylene copolymer," *Polymer*, vol. 50, 2009, pp. 747-751.

Senichev et al., "Theories of Compatibility," Chapter 6, *Handbook of Plasticizers*, edited by George Wypych, ChemTec Publishing, 2004, pp. 121-150.

Sun et al., "Toughening of poly(butylene terephthalate) with epoxy-functionalized acrylonitrile-butadiene-styrene," *Polymer*, vol. 46, 2005, pp. 7632-7643.

Xanthos et al., "Reactive Modification of Polyethylene Terephthalate With Polyepxides," *Polymer Engineering and Science*, vol. 41, No. 4, Apr. 2001, pp. 643-655.

Zhang et al. "Preparation and properties of biodegradable poly(lactic acid)/poly(butylene adipate-co-terephthalate) blend with glycidyl methacrylate as reactive processing agent," *J. Mater. Sci.*, vol. 44, 2009, pp. 250-256.

NatureWorks® PLA Polymer 6201D (Fiber Melt Spinning)—Product Information—3 pages.

NatureWorks®—PLA Processing Guide for Spinning Fibers, Mar. 15, 2005, 14 pages.

NatureWorks®—Technology Focus Report: Blends of PLA with Other Thermoplastics, 2007, 6 pages.

NatureWorks®—Technology Focus Report: Toughened PLA, 2007, 5 pages.

Product Information on Lotader® AX8950 from Arkema, Jul. 2004, 2 pages.

Search Report and Written Opinion for PCT/IB2011/053010 dated Mar. 28, 2012, 11 pages.

Machine Translation of JPH09059498, Mar. 4, 1997.
Machine Translation of JP2005-088600, Apr. 7, 2005.
Machine Translation of JP2007-270076, Oct. 18, 2007.
Machine Translation of JP2009-197099, Sep. 3, 2009.
Machine Translation of JP2010-001369, Jan. 7, 2010.
Machine Translation of JP2010-046852, Mar. 4, 2010.

Abstract of Article—Balakrishnan et al., "Mechanical, Thermal, and Morphological Properties of Polylactic Acid/Linear Low Density Polyethylene Blends," *Journal of Elastomers and Plastics*, vol. 42, No. 3, May 2010, pp. 223-239.

Article—Gramlich et al., "Reactive Compatibilization of Poly(L-lactide) and Conjugated Soybean Oil," *Macromolecules*, vol. 43, No. 5, 2010, pp. 2313-2321.

Article—Jing et al., "A Bifunctional Monomer Derived from Lactide for Toughening Polylactide," *J. Am. Chem. Soc.*, vol. 130, No. 42, 2008, pp. 13826-13867.

(56) References Cited

OTHER PUBLICATIONS

Article—Robertson et al., "Toughening of Polylactide with Polymerized Soybean Oil," *Macromolecules*, vol. 43, 2010, pp. 1807-1814.
Part of Book—Biopolymers, vol. 4, Polyester III, Applications and Commercial Products, Edited by Y. Doi and A. Steinbüchel—Polylactides by Prof. Dr. Hideto Tsuji, 2002, pp. 129-177.
Part of Book—Handbook of Plasticizers, $2^{nd}$ Edition, 2004, 2012—Theories of Compatability by Yu et al.
F.C. Campbell—Chapter 1—Introduction to Composite Materials, Copyright© 2010, ASM International®, pp. 1-29.
Karst et al., "Using the solubility parameter to explain disperse dye sorption on polylactide".

* cited by examiner

TOUGHENED POLYLACTIC ACID FIBERS

BACKGROUND OF THE INVENTION

Various attempts have been made to form nonwoven webs from biodegradable polymers. Although fibers prepared from biodegradable polymers are known, problems have been encountered with their use. For example, polylactic acid ("PLA") is one of the most common biodegradable and sustainable (renewable) polymers used to form nonwoven webs. Unfortunately, PLA nonwoven webs generally possess a low bond flexibility and high roughness due to the high glass transition temperature and slow crystallization rate of polylactic acid. In turn, thermally bonded PLA nonwoven webs often exhibit low elongations that are not acceptable in certain applications, such as in an absorbent article. Likewise, though polylactic acid may withstand high draw ratios, it requires high levels of draw energy to achieve the crystallization needed to overcome heat shrinkage. In response to these difficulties, plasticizers have been employed in an attempt to reduce the glass transition temperature and improve bonding and softness. One common plasticizer is polyethylene glycol. Unfortunately, polyethylene glycol tends to phase separate from polylactic acid during aging, especially in high humidity and elevated temperature environment, which deteriorates the mechanical properties of the resulting fibers over time. The addition of plasticizers also causes other problems, such as degradation in melt spinning, and a reduction in melt strength and drawability.

As such, a need currently exists for polylactic fibers that exhibit good elongation properties, yet remain strong.

SUMMARY OF THE INVENTION

In accordance with one embodiment of the present invention, a polylactic acid fiber is disclosed that extends in a longitudinal direction and has an average diameter of from about 2 to about 25 micrometers. The fiber comprises a thermoplastic composition that contains a plurality of discrete domains dispersed within a continuous phase, the discrete domains containing a polymeric toughening additive and the continuous phase containing polylactic acid. At least one of the discrete domains is elongated in the longitudinal direction of the fiber and has a length of from about 5 to about 400 micrometers. The fiber exhibits a peak elongation of about 25% or more and a tenacity of from about 0.75 to about 6 grams-force per denier.

In accordance with another embodiment of the present invention, a method for forming a polylactic acid fiber is disclosed. The method comprises blending a polylactic acid with a polymeric toughening additive to form a thermoplastic composition, wherein the composition contains a plurality of discrete domains dispersed within a continuous phase. The discrete domains contain the polymeric toughening additive and the continuous phase contains the polylactic acid. The thermoplastic composition is extruded through a die and drawn to form a fiber. The domains of the drawn fiber are elongated in a longitudinal direction of the fiber so that the length of the elongated domains is greater than the length of the domains prior to drawing.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which:

FIG. 2 is a schematic illustration of the formation of discrete domains of the toughening additive upon fiber drawing, in which FIG. 2A shows the domains before fiber drawing and FIG. 2B shows the domains after fiber drawing;

Figure 1:
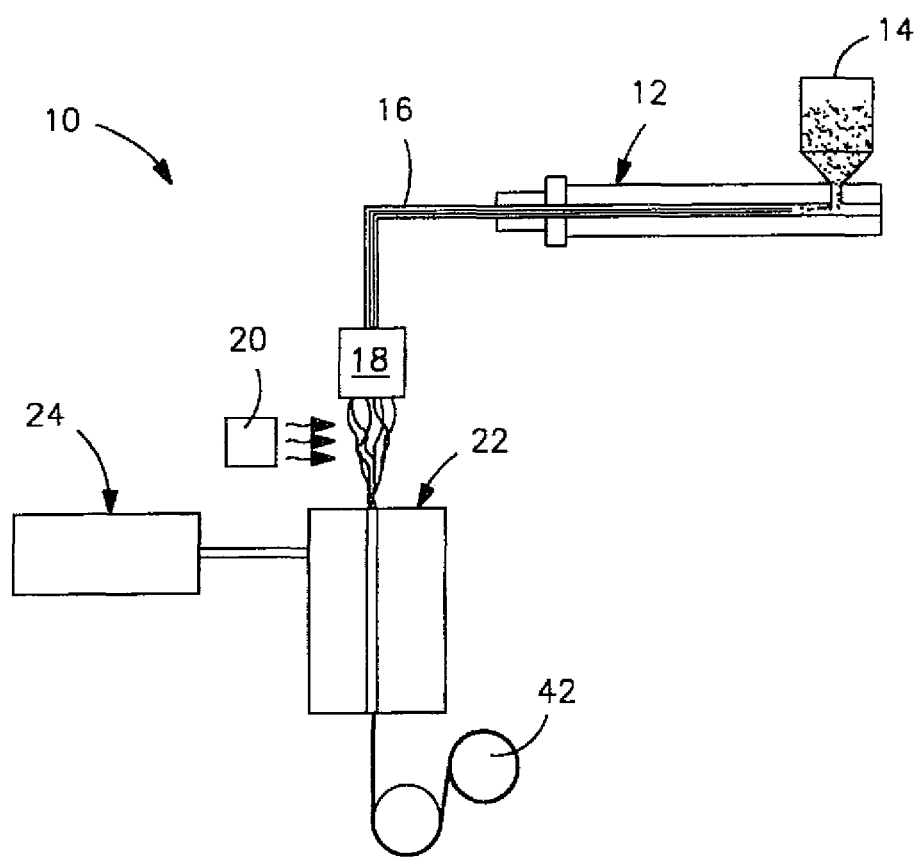
FIG. 1 is a schematic illustration of a process that may be used in one embodiment of the present invention to form fibers.

Repeat use of references characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Definitions

As used herein, the term "biodegradable" or "biodegradable polymer" generally refers to a material that degrades from the action of naturally occurring microorganisms, such as bacteria, fungi, and algae; environmental heat; moisture; or other environmental factors. The biodegradability of a material may be determined using ASTM Test Method 5338.92.

As used herein, the term "fibers" refer to elongated extrudates formed by passing a polymer through a forming orifice such as a die. Unless noted otherwise, the term "fibers" includes both discontinuous fibers having a definite length and substantially continuous filaments. Substantially filaments may, for instance, have a length much greater than their diameter, such as a length to diameter ratio ("aspect ratio") greater than about 15,000 to 1, and in some cases, greater than about 50,000 to 1.

As used herein, the term "monocomponent" refers to fibers formed from one polymer. Of course, this does not exclude fibers to which additives have been added for color, anti-static properties, lubrication, hydrophilicity, liquid repellency, etc.

As used herein, the term "multicomponent" refers to fibers formed from at least two polymers (e.g., bicomponent fibers) that are extruded from separate extruders. The polymers are arranged in substantially constantly positioned distinct zones across the cross-section of the fibers. The components may be arranged in any desired configuration, such as sheath-core, side-by-side, segmented pie, island-in-the-sea, and so forth. Various methods for forming multicomponent fibers are described in U.S. Pat. No. 4,789,592 to Taniguchi et al. and U.S. Pat. No. 5,336,552 to Strack et al., U.S. Pat. No. 5,108,820 to Kaneko, et al., U.S. Pat. No. 4,795,668 to Kruege, et al., U.S. Pat. No. 5,382,400 to Pike, et al., U.S. Pat. No. 5,336,552 to Strack, et al., and U.S. Pat. No. 6,200,669 to Marmon, et al., which are incorporated herein in their entirety by reference thereto for all purposes. Multicomponent fibers having various irregular shapes may also be formed, such as described in U.S. Pat. No. 5,277,976 to Hogle, et al., U.S. Pat. No. 5,162,074 to Hills, U.S. Pat. No. 5,466,410 to Hills, U.S. Pat. No. 5,069,970 to Largman, et al., and U.S. Pat. No. 5,057,368 to Largman, et al., which are incorporated herein in their entirety by reference thereto for all purposes.

As used herein, the term "nonwoven web" refers to a web having a structure of individual fibers that are randomly interlaid, not in an identifiable manner as in a knitted fabric. Nonwoven webs include, for example, meltblown webs, spunbond webs, carded webs, wet-laid webs, airlaid webs, coform webs, hydraulically entangled webs, etc. The basis weight of the nonwoven web may generally vary, but is typically from about 5 grams per square meter ("gsm") to 200 gsm, in some embodiments from about 10 gsm to about 150 gsm, and in some embodiments, from about 15 gsm to about 100 gsm.

As used herein, the term "meltblown" web or layer generally refers to a nonwoven web that is formed by a process in which a molten thermoplastic material is extruded through a plurality of fine, usually circular, die capillaries as molten fibers into converging high velocity gas (e.g., air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al.; U.S. Pat. No. 4,307,143 to Meitner, et al.; and U.S. Pat. No. 4,707,398 to Wisneski, et al., which are incorporated herein in their entirety by reference thereto for all purposes. Meltblown fibers may be substantially continuous or discontinuous, and are generally tacky when deposited onto a collecting surface.

As used herein, the term "spunbond" web or layer generally refers to a nonwoven web containing small diameter substantially continuous filaments. The filaments are formed by extruding a molten thermoplastic material from a plurality of fine, usually circular, capillaries of a spinnerette with the diameter of the extruded filaments then being rapidly reduced as by, for example, eductive drawing and/or other well-known spunbonding mechanisms. The production of spunbond webs is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., and U.S. Pat. No. 5,382,400 to Pike, et al., which are incorporated herein in their entirety by reference thereto for all purposes.

Spunbond filaments are generally not tacky when they are deposited onto a collecting surface. Spunbond filaments may sometimes have diameters less than about 40 micrometers, and are often between about 5 to about 20 micrometers.

Test Methods

Melt Flow Rate:

The melt flow rate ("MFR") is the weight of a polymer (in grams) forced through an extrusion rheometer orifice (0.0825-inch diameter) when subjected to a load of 2160 grams in 10 minutes, typically at 190° C. or 230° C. Unless otherwise indicated, melt flow rate is measured in accordance with ASTM Test Method D1239 with a Tinius Olsen Extrusion Plastometer.

Thermal Properties:

The melting temperature and glass transition temperature may be determined by differential scanning calorimetry (DSC). The differential scanning calorimeter may be a DSC Q100 Differential Scanning calorimeter, which was outfitted with a liquid nitrogen cooling accessory and with a UNIVERSAL ANALYSIS 2000 (version 4.6.6) analysis software program, both of which are available from T.A. Instruments Inc. of New Castle, Del. To avoid directly handling the samples, tweezers or other tools are used. The samples are placed into an aluminum pan and weighed to an accuracy of 0.01 milligram on an analytical balance. A lid is crimped over the material sample onto the pan. Typically, the resin pellets are placed directly in the weighing pan, and the fibers are cut to accommodate placement on the weighing pan and covering by the lid.

The differential scanning calorimeter is calibrated using an indium metal standard and a baseline correction is performed, as described in the operating manual for the differential scanning calorimeter. A material sample is placed into the test chamber of the differential scanning calorimeter for testing, and an empty pan is used as a reference. All testing is run with a 55-cubic centimeter per minute nitrogen (industrial grade) purge on the test chamber. For resin pellet samples, the heating and cooling program is a 2-cycle test that began with an equilibration of the chamber to −30° C., followed by a first heating period at a heating rate of 10° C. per minute to a temperature of 200° C., followed by equilibration of the sample at 200° C. for 3 minutes, followed by a first cooling period at a cooling rate of 10° C. per minute to a temperature of −30° C., followed by equilibration of the sample at −30° C. for 3 minutes, and then a second heating period at a heating rate of 10° C. per minute to a temperature of 200° C. For fiber samples, the heating and cooling program is a 1-cycle test that began with an equilibration of the chamber to −25° C., followed by a heating period at a heating rate of 10° C. per minute to a temperature of 200° C., followed by equilibration of the sample at 200° C. for 3 minutes, and then a cooling period at a cooling rate of 10° C. per minute to a temperature of −30° C. All testing is run with a 55-cubic centimeter per minute nitrogen (industrial grade) purge on the test chamber.

The results are evaluated using the UNIVERSAL ANALYSIS 2000 analysis software program, which identified and quantified the glass transition temperature ($T_g$) of inflection, the endothermic and exothermic peaks, and the areas under the peaks on the DSC plots. The glass transition temperature is identified as the region on the plot-line where a distinct change in slope occurred, and the melting temperature is determined using an automatic inflection calculation.

Tensile Properties:

Individual fiber specimens are shortened (e.g., cut with scissors) to 38 millimeters in length, and placed separately on a black velvet cloth. 10 to 15 fiber specimens are collected in this manner. The fiber specimens are then mounted in a substantially straight condition on a rectangular paper frame having external dimension of 51 millimeters×51 millimeters and internal dimension of 25 millimeters×25 millimeters. The ends of each fiber specimen are operatively attached to the frame by carefully securing the fiber ends to the sides of the frame with adhesive tape. Each fiber specimen is then measured for its external, relatively shorter, cross-fiber dimension employing a conventional laboratory microscope, which has been properly calibrated and set at 40× magnification. This cross-fiber dimension is recorded as the diameter of the individual fiber specimen. The frame helps to mount the ends of the sample fiber specimens in the upper and lower grips of a constant rate of extension type tensile tester in a manner that avoids excessive damage to the fiber specimens.

A constant rate of extension type of tensile tester and an appropriate load cell are employed for the testing. The load cell is chosen (e.g., 10N) so that the test value falls within 10-90% of the full scale load. The tensile tester (i.e., MTS SYNERGY 200) and load cell are obtained from MTS Systems Corporation of Eden Prairie, Mich. The fiber specimens in the frame assembly are then mounted between the grips of the tensile tester such that the ends of the fibers are operatively held by the grips of the tensile tester. Then, the sides of the paper frame that extend parallel to the fiber length are cut or otherwise separated so that the tensile tester applies the test force only to the fibers. The fibers are then subjected to a pull test at a pull rate and grip speed of 12 inches per minute. The resulting data is analyzed using a TESTWORKS 4 software program from the MTS Corporation with the following test settings:

| Calculation Inputs | | Test Inputs | |
|---|---|---|---|
| Break mark drop | 50% | Break sensitivity | 90% |
| Break marker elongation | 0.1 in | Break threshold | 10 $g_f$ |
| Nominal gage length | 1 in | Data Acq. Rate | 10 Hz |
| Slack pre-load | 1 $lb_f$ | Denier length | 9000 m |
| Slope segment length | 20% | Density | 1.25 g/cm$^3$ |
| Yield offset | 0.20% | Initial speed | 12 in/min |
| Yield segment length | 2% | Secondary speed | 2 in/min |

The tenacity values are expressed in terms of gram-force per denier. Peak elongation (% strain at break) is also measured.

Moisture Content

Moisture content may be determined using an Arizona Instruments Computrac Vapor Pro moisture analyzer (Model No. 3100) in substantial accordance with ASTM D 7191-05, which is incorporated herein in its entirety by reference thereto for all purposes. The test temperature (§ X2.1.2) may be 130° C., the sample size (§ X2.1.1) may be 2 to 4 grams, and the vial purge time (§ X2.1.4) may be 30 seconds. Further, the ending criteria (§ X2.1.3) may be defined as a "prediction" mode, which means that the test is ended when the built-in programmed criteria (which mathematically calculates the end point moisture content) is satisfied.

Detailed Description

Generally speaking, the present invention is directed to polylactic acid fibers formed from a thermoplastic composition that contains polylactic acid and a polymeric toughening additive. The present inventors have discovered that the specific nature of the components and process by which they are blended may be carefully controlled to achieve a composition having desirable morphological features. More particularly, the toughening additive can be dispersed as discrete physical domains within a continuous phase of the polylactic acid. These domains have a particular size, shape, and distribution such that upon fiber drawing, they absorb energy and become elongated. This allows the resulting composition to exhibit a more pliable and softer behavior than the otherwise rigid polylactic acid. Through selective control over the components and method employed, the present inventors have discovered that the resulting fibers may thus exhibit good mechanical properties, both during and after melt spinning.

Various embodiments of the present invention will now be described in more detail.

I. Thermoplastic Composition

A. Polylactic Acid

Polylactic acid may generally be derived from monomer units of any isomer of lactic acid, such as levorotory-lactic acid ("L-lactic acid"), dextrorotatory-lactic acid ("D-lactic acid"), meso-lactic acid, or mixtures thereof. Monomer units may also be formed from anhydrides of any isomer of lactic acid, including L-lactide, D-lactide, meso-lactide, or mixtures thereof. Cyclic dimers of such lactic acids and/or lactides may also be employed. Any known polymerization method, such as polycondensation or ring-opening polymerization, may be used to polymerize lactic acid. A small amount of a chain-extending agent (e.g., a diisocyanate compound, an epoxy compound or an acid anhydride) may also be employed. The polylactic acid may be a homopolymer or a copolymer, such as one that contains monomer units derived from L-lactic acid and monomer units derived from D-lactic acid. Although not required, the rate of content of one of the monomer unit derived from L-lactic acid and the monomer unit derived from D-lactic acid is preferably about 85 mole % or more, in some embodiments about 90 mole % or more, and in some embodiments, about 95 mole % or more. Multiple polylactic acids, each having a different ratio between the monomer unit derived from L-lactic acid and the monomer unit derived from D-lactic acid, may be blended at an arbitrary percentage. Of course, polylactic acid may also be blended with other types of polymers (e.g., polyolefins, polyesters, etc.) to provided a variety of different of benefits, such as processing, fiber formation, etc.

In one particular embodiment, the polylactic acid has the following general structure:

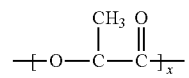

One specific example of a suitable polylactic acid polymer that may be used in the present invention is commercially available from Biomer, Inc. of Krailling, Germany) under the name BIOMER™ L9000. Other suitable polylactic acid polymers are commercially available from Natureworks LLC of Minnetonka, Minn. (NATUREWORKS®) or Mitsui Chemical (LACEA™). Still other suitable polylactic acids may be described in U.S. Pat. Nos. 4,797,468; 5,470,944; 5,770,682; 5,821,327; 5,880,254; and 6,326,458, which are incorporated herein in their entirety by reference thereto for all purposes.

The polylactic acid typically has a melting point of from about 140° C. to about 260° C., in some embodiments from about 150° C. to about 250° C., and in some embodiments, from about 160° C. to about 220° C. Such polylactic acids are useful in that they biodegrade at a fast rate. The glass transition temperature ("$T_g$") of the polylactic acid may be relatively high, such as from about 40° C. to about 80° C., in some embodiments from about 50° C. to about 80° C., and in some embodiments, from about 55° C. to about 65° C. As discussed in more detail above, the melting temperature and glass transition temperature may be determined using differential scanning calorimetry ("DSC") in accordance with ASTM D-3417.

The polylactic acid typically has a number average molecular weight ("$M_n$") ranging from about 40,000 to about 160,000 grams per mole, in some embodiments from about 50,000 to about 140,000 grams per mole, and in some embodiments, from about 80,000 to about 120,000 grams per mole. Likewise, the polymer also typically has a weight average molecular weight ("$M_w$") ranging from about 80,000 to about 200,000 grams per mole, in some embodiments from about 100,000 to about 180,000 grams per mole, and in some embodiments, from about 110,000 to about 160,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 3.0, in some embodiments from about 1.1 to about 2.0, and in some embodiments, from about 1.2 to about 1.8. The weight and number average molecular weights may be determined by methods known to those skilled in the art.

The polylactic acid may also have an apparent viscosity of from about 50 to about 600 Pascal seconds (Pa·s), in some embodiments from about 100 to about 500 Pa·s, and in some embodiments, from about 200 to about 400 Pa·s, as determined at a temperature of 190° C. and a shear rate of 1000 sec$^{-1}$. The melt flow rate of the polylactic acid (on a dry basis) may also range from about 0.1 to about 40 grams per 10 minutes, in some embodiments from about 0.5 to about 20 grams per 10 minutes, and in some embodiments, from about 5 to about 15 grams per 10 minutes, determined at a load of 2160 grams and at 190° C.

B. Polymeric Toughening Additive

The thermoplastic composition of the present invention also contains a polymeric toughening additive. Due to its polymeric nature, the toughening additive possesses a relatively high molecular weight that can help improve the melt strength and stability of the thermoplastic composition. It is typically desired that the polymeric toughening additive is generally immiscible with the polylactic acid. In this manner, the toughening additive can become dispersed as discrete phase domains within a continuous phase of the polylactic acid. The discrete domains are capable of absorbing energy that arises from stress imparted during elongation of the composition during fiber drawing, which increases the overall toughness and strength of the resulting fibers. While the polymers are generally immiscible, the toughening additive may nevertheless be selected to have a solubility parameter that is relatively similar to that of polylactic acid. This generally improves the interfacial adhesion and physical interaction of the boundaries of the discrete and continuous phases, and thus reduces the likelihood that the composition will fracture upon stretching. In this regard, the ratio of the solubility parameter for polylactic acid to that of the toughening additive is typically from about 0.5 to about 1.5, and in some embodiments, from about 0.8 to about 1.2.

For example, the polymeric toughening additive may have a solubility parameter of from about 15 to about 30 MJoules$^{1/2}$/m$^{3/2}$, and in some embodiments, from about 18 to about 22 MJoules$^{1/2}$/m$^{3/2}$, while the polylactic acid may have a solubility parameter of about 20.5 MJoules$^{1/2}$/m$^{3/2}$. The term "solubility parameter" as used herein refers to the "Hildebrand Solubility Parameter", which is the square root of the cohesive energy density and calculated according to the following equation:

$$\delta = \sqrt{(\Delta H_v - RT)/V_m}$$

where:
$\Delta Hv$=heat of vaporization
R=Ideal Gas constant
T=Temperature
Vm=Molecular Volume The Hildebrand solubility parameters for many polymers are also available from the Solubility Handbook of Plastics, by Wyeych (2004), which is incorporated herein by reference.

The polymeric toughening additive is also selected to have a certain melt flow rate (or viscosity) to ensure that the discrete domains can be adequately maintained. For example, if the melt flow rate of the toughening additive is too high, it tends to flow and disperse uncontrollably through the continuous phase. This results in lamellar or plate-like domains that are difficult to maintain and also likely to prematurely fracture during fiber drawing. Conversely, if the melt flow rate of the toughening additive is too low, it tends to clump together and form very large elliptical domains, which are difficult to disperse during blending. This may cause uneven distribution of the toughening additive through the entirety of the continuous phase. In this regard, the present inventors have discovered that the ratio of the melt flow rate of the toughening additive to the melt flow rate of the polylactic acid is typically from about 0.2 to about 8, in some embodiments from about 0.5 to about 6, and in some embodiments, from about 1 to about 5. The polymeric toughening additive may, for example, have a melt flow rate of from about 0.1 to about 250 grams per 10 minutes, in some embodiments from about 0.5 to about 200 grams per 10 minutes, and in some embodiments, from about 5 to about 150 grams per 10 minutes, determined at a load of 2160 grams and at 190° C.

In addition to the properties noted above, the mechanical characteristics of the polymeric toughening additive are also generally selected to achieve the desired increase in fiber toughness. For example, when a blend of the polylactic acid and toughening additive is stretched during fiber drawing, shear and/or plastic yielding zones may be initiated at and around the discrete phase domains as a result of stress concentrations that arise from a difference in the elastic modulus of the toughening additive and polylactic acid. Larger stress concentrations promote more intensive localized plastic flow at the domains, which allows them to become significantly elongated during fiber drawing. These elongated domains allow the composition to exhibit a more pliable and softer behavior than the otherwise rigid polylactic acid resin. To enhance the stress concentrations, the toughening additive is selected to have a relatively low Young's modulus of elasticity in comparison to the polylactic acid. For example, the ratio of the modulus of elasticity of polylactic acid to that of the toughening additive is typically from about 1 to about 250, in some embodiments from about 2 to about 100, and in some embodiments, from about 2 to about 50. The modulus of elasticity of the toughening additive may, for instance, range from about 2 to about 500 Megapascals (MPa), in some embodiments from about 5 to about 300 MPa, and in some embodiments, from about 10 to about 200 MPa. To the contrary, the modulus of elasticity of polylactic acid is typically from about 800 MPa to about 2000 MPa.

To impart the desired increase in toughness, the polymeric toughening additive may also exhibit a peak elongation (i.e., the percent elongation of the polymer at its peak load) greater than polylactic acid. For example, the polymeric toughening additive of the present invention may exhibit a peak elongation of about 50% or more, in some embodiments about 100% or more, in some embodiments from about 100% to about 2000%, and in some embodiments, from about 250% to about 1500%.

While a wide variety of polymeric additives may be employed that have the properties identified above, particularly suitable examples of such polymers may include, for instance, polyolefins (e.g., polyethylene, polypropylene, polybutylene, etc.); polytetrafluoroethylenes; polyesters (e.g., recycled polyester, polyethylene terephthalate, etc.); polyvinyl acetates (e.g., poly(ethylene vinyl acetate), polyvinyl chloride acetate, etc.); polyvinyl alcohols (e.g., polyvinyl alcohol, poly(ethylene vinyl alcohol), etc.); polyvinyl butyrals; acrylic resins (e.g., polyacrylate, polymethylacrylate, polymethylmethacrylate, etc.); polyamides (e.g., nylon); polyvinyl chlorides; polyvinylidene chlorides; polystyrenes; polyurethanes; etc. Suitable polyolefins may, for instance, include ethylene polymers (e.g., low density polyethylene ("LDPE"), high density polyethylene ("HDPE"), linear low density polyethylene ("LLDPE"), etc.), propylene homopolymers (e.g., syndiotactic, atactic, isotactic, etc.), propylene copolymers, and so forth.

In one particular embodiment, the polymer is a propylene polymer, such as homopolypropylene or a copolymer of propylene. The propylene polymer may, for instance, be formed a substantially isotactic polypropylene homopolymer or a copolymer containing equal to or less than about 10 wt. % of other monomer, i.e., at least about 90% by weight propylene. Such homopolymers may have a melting point of from about 160° C. to about 170° C.

In still another embodiment, the polyolefin may be a copolymer of ethylene or propylene with another α-olefin, such as a $C_3$-$C_{20}$ α-olefin or $C_3$-$C_{12}$ α-olefin. Specific examples of suitable α-olefins include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene, 1-hexene and 1-octene. The ethylene or propylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

Exemplary olefin copolymers for use in the present invention include ethylene-based copolymers available under the designation EXACT™ from ExxonMobil Chemical Company of Houston, Tex. Other suitable ethylene copolymers are available under the designation ENGAGE™, AFFINITY™, DOWLEX™ (LLDPE) and ATTANE™ (ULDPE) from Dow Chemical Company of Midland, Mich. Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai, et al., which are incorporated herein in their entirety by reference thereto for all purposes. Suitable propylene copolymers are also commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al., which are incorporated herein in their entirety by reference thereto for all purposes.

Any of a variety of known techniques may generally be employed to form the olefin copolymers. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces ethylene copolymers in which the comonomer is randomly distributed within a molecular chain and uniformly distributed across the different molecular weight fractions. Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obijeski et al.; U.S. Pat. No. 5,272,236 to Lai et al.; and U.S. Pat. No. 6,090,325 to Wheat, et al., which are incorporated herein in their entirety by reference thereto for all purposes. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers ($M_w/M_n$) of below 4, controlled short chain branching distribution, and controlled isotacticity.

Regardless of the materials employed, the relative percentage of the polymeric toughening additive in the thermoplastic composition is selected to achieve the desired properties without significantly impacting the biodegradability of the resulting composition. For example, the toughening additive is typically employed in an amount of from about 0.1 wt. % to about 30 wt. %, in some embodiments from about 0.5 wt. % to about 20 wt. %, and in some embodiments, from about 2 wt. % to about 12 wt. % of the thermoplastic composition, based on the weight of the polylactic acid employed in the composition. Depending on what other components are employed, the actual concentration of the toughening additive in the entire thermoplastic composition may be the same or less than the ranges noted above. In certain embodiments, for example, the toughening additive constitutes from about 1 wt. % to about 30 wt. %, in some embodiments from about 2 wt. % to about 25 wt. %, and in some embodiments, from about 5 wt. % to about 20 wt. % of the thermoplastic composition. Likewise, polylactic acid may constitute from about 70 wt. % to about 99 wt. %, in some embodiments from about 75 wt. % to about 98 wt. %, and in some embodiments, from about 80 wt. % to about 95 wt. % of the composition.

C. Compatibilizer

As indicated above, the polymeric toughening additive is generally selected so that it has a solubility parameter relatively close to that of polylactic acid. Among other things, this can enhance the adhesion of the phases and improve the overall distribution of the discrete domains within the continuous phase. Nevertheless, in certain embodiments, a compatibilizer may optionally be employed to further enhance the compatibility between the polylactic acid and the polymeric toughening additive. This may be particularly desirable when the polymeric toughening additive possesses a polar moiety, such as polyurethanes, acrylic resins, etc. When employed, the compatibilizers typically constitute from about 1 wt. % to about 20 wt. %, in some embodiments from about 2 wt. % to about 15 wt. %, and in some embodiments, from about 4 wt. % to about 10 wt. % of the thermoplastic composition. One example of a suitable compatibilizer is a functionalized polyolefin that possesses a polar component provided by one or more functional groups that is compatible with the water-soluble polymer and a non-polar component provided by an olefin that is compatible with the olefinic elastomer. The polar component may, for example, be provided by one or more functional groups and the non-polar component may be provided by an olefin. The olefin component of the compatibilizer may generally be formed from any linear or branched α-olefin monomer, oligomer, or polymer (including copolymers) derived from an olefin monomer, such as described above.

The functional group of the compatibilizer may be any group that provides a polar segment to the molecule. Particularly suitable functional groups are maleic anhydride, maleic acid, fumaric acid, maleimide, maleic acid hydrazide, a reaction product of maleic anhydride and diamine, methylnadic anhydride, dichloromaleic anhydride, maleic acid amide, etc. Maleic anhydride modified polyolefins are particularly suitable for use in the present invention. Such modified polyolefins are typically formed by grafting maleic anhydride onto a polymeric backbone material. Such maleated polyolefins are available from E. I. du Pont de Nemours and Company under the designation Fusabond®, such as the P Series (chemically modified polypropylene), E Series (chemically modified polyethylene), C Series (chemically modified ethylene vinyl acetate), A Series (chemically modified ethylene acrylate copolymers or terpolymers), or N Series (chemically modified ethylene-propylene, ethylene-propylene diene monomer ("EPDM") or ethylene-octene). Alternatively, maleated polyolefins are also available from Chemtura Corp. under the designation Polybond® and Eastman Chemical Company under the designation Eastman G series.

D. Other Components

One beneficial aspect of the present invention is that good mechanical properties (e.g., elongation) may be provided without the need for conventional plasticizers, such as alkylene glycols (e.g., polyethylene glycols, such as those available from Dow Chemical under the name Carbowax™), alkane diols, and alkylene oxides that possess one or more hydroxyl groups which attack the ester linkages of the polylactic acid and result in hydrolytic degradation. Other examples of such plasticizers are described in U.S. Pat. No. 2010/0048082 to Topolkaraev, et al., which is incorporated herein in its entirety by reference thereto for all purposes. The thermoplastic composition of the present invention may thus be substantially free of such plasticizers. Nevertheless, it should be understood that plasticizers may be used in certain embodiments of the present invention. When utilized, however, the plasticizers are typically present in an amount of less than about 10 wt. %, in some embodiments from about 0.1 wt. % to about 5 wt. %, and in some embodiments, from about 0.2 wt. % to about 2 wt. % of the thermoplastic composition.

Of course, other ingredients may be utilized for a variety of different reasons. For instance, materials that may be used include, without limitation, catalysts, pigments, antioxidants, stabilizers, surfactants, waxes, flow promoters, solid solvents, nucleating agents (e.g., titanium dioxide, calcium carbonate, etc.), particulates, and other materials added to enhance the processability of the thermoplastic composition. When utilized, it is normally desired that the amounts of these additional ingredients are minimized to ensure optimum compatibility and cost-effectiveness. Thus, for example, it is normally desired that such ingredients constitute less than about 10 wt. %, in some embodiments less than about 8 wt. %, and in some embodiments, less than about 5 wt. % of the thermoplastic composition.

It should also be understood that other components may be included in the thermoplastic composition. One such component that may be employed is an additional biodegradable polyester, including aliphatic polyesters, such as polycaprolactone, polyesteramides, modified polyethylene terephthalate, polylactic acid (PLA) and its copolymers, terpolymers based on polylactic acid, polyglycolic acid, polyalkylene carbonates (e.g., polyethylene carbonate), poly-3-hydroxybutyrate (PHB), poly-3-hydroxyvalerate (PHV), poly-3-hydroxybutyrate-co-4-hydroxybutyrate, poly-3-hydroxybutyrate-co-3-hydroxyvalerate copolymers (PHBV), poly-3-hydroxybutyrate-co-3-hydroxyhexanoate, poly-3-hydroxybutyrate-co-3-hydroxyoctanoate, poly-3-hydroxybutyrate-co-3-hydroxydecanoate, poly-3-hydroxybutyrate-co-3-hydroxyoctadecanoate, and succinate-based aliphatic polymers (e.g., polybutylene succinate, polybutylene succinate adipate, polyethylene succinate, etc.); aliphatic-aromatic copolyesters (e.g., polybutylene adipate terephthalate, polyethylene adipate terephthalate, polyethylene adipate isophthalate, polybutylene adipate isophthalate, etc.), and so forth.

II. Blending

Neat polylactic acid will generally absorb water from the ambient environment such that it has a moisture content of about 500 too 600 parts per million ("ppm"), or even greater, based on the dry weight of the starting polylactic acid. Moisture content may be determined in a variety of ways as is known in the art, such as in accordance with ASTM D 7191-05, such as described above. Because the presence of water during melt processing can hydrolytically degrade polylactic acid and reduce its molecular weight, it is sometimes desired to dry the polylactic acid prior to blending. In most embodiments, for example, it is desired that the polylactic acid have a moisture content of about 300 parts per million ("ppm") or less, in some embodiments about 200 ppm or less, in some embodiments from about 1 to about 100 ppm prior to blending with the toughening additive. Drying of the polylactic acid may occur, for instance, at a temperature of from about 50° C. to about 100° C., and in some embodiments, from about 70° C. to about 80° C.

Once optionally dried, the polylactic acid and toughening additive may be blended using any of a variety of known techniques. In one embodiment, for example, the raw materials (e.g., polylactic acid and toughening additive) may be supplied separately or in combination. For instance, the raw materials may first be dry mixed together to form an essentially homogeneous dry mixture. The raw materials may likewise be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. Particularly suitable melt processing devices may be a co-rotating, twin-screw extruder (e.g., ZSK-30 extruder available from Werner & Pfleiderer Corporation of Ramsey, N.J. or a Thermo Prism™ USALAB 16 extruder available from Thermo Electron Corp., Stone, England). Such extruders may include feeding and venting ports and provide high intensity distributive and dispersive mixing. For example, the polylactic acid and toughening additive may be fed to the same or different feeding ports of the twin-screw extruder and melt blended to form a substantially homogeneous melted mixture. If desired, other additives may also be injected into the polymer melt and/or separately fed into the extruder at a different point along its length. Alternatively, the additives may be pre-blended with the polylactic acid and/or the toughening additive.

Regardless of the particular processing technique chosen, the raw materials are blended under sufficient shear/pressure and heat to ensure sufficient dispersion, but not so high as to adversely reduce the size of the discrete domains so that they are incapable of achieving the desired fiber toughness and elongation. For example, blending typically occurs at a temperature of from about 170° C. to about 230° C., in some embodiments from about 175° C. to about 220° C., and in some embodiments, from about 180° C. to about 210° C. Likewise, the apparent shear rate during melt processing may range from about 10 seconds$^{-1}$ to about 3000 seconds$^{-1}$, in some embodiments from about 50 seconds$^{-1}$ to about 2000 seconds$^{-1}$, and in some embodiments, from about 100 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows. Of course, other variables, such as the residence time during melt processing, which is inversely proportional to throughput rate, may also be controlled to achieve the desired degree of homogeneity.

To achieve the desired shear conditions (e.g., rate, residence time, shear rate, melt processing temperature, etc.), the speed of the extruder screw(s) may be selected with a certain range. Generally, an increase in product temperature is observed with increasing screw speed due to the additional mechanical energy input into the system. For example, the screw speed may range from about 50 to about 300 revolutions per minute ("rpm"), in some embodiments from about 70 to about 250 rpm, and in some embodiments, from about 100 to about 200 rpm. This may result in a temperature that is sufficient high to disperse the toughening additive without adversely impacting the size of the resulting domains. The melt shear rate, and in turn the degree to which the polymers are dispersed, may also be increased through the use of one or more distributive and/or dispersive mixing elements within the mixing section of the extruder. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin (VIP) mixers.

Figure 2:
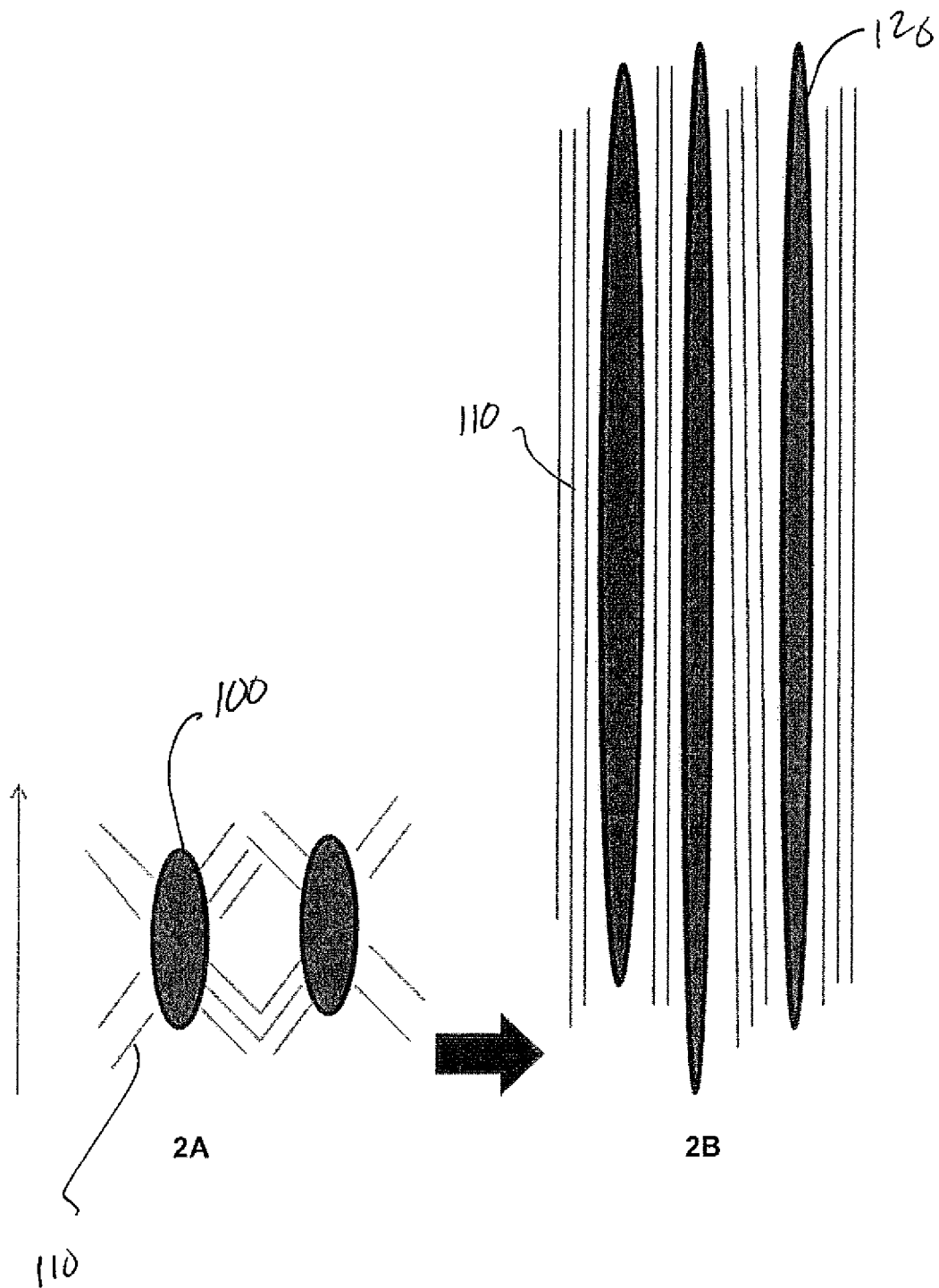

As a result of melt blending, a plurality of discrete phase domains are formed and distributed throughout the continuous polylactic acid matrix. The domains may have a variety of different shapes, such as elliptical, spherical, cylindrical, etc. In one embodiment, for example, the domains have a substantially elliptical shape after blending of the polymers. Referring to FIG. 2A, for example, one schematic representation of such elliptical domains 100 is shown within a primary polymer matrix 110. The physical dimension of an individual domain, after blending, is typically small enough to minimize the propagation of cracks through the polymer material upon drawing, but large enough to initiate microscopic plastic deformation and allow for shear zones at and around particle inclusions. For example, the axial dimension of a domain (e.g., length) typically ranges from about 0.05 µm to about 30 µm, in some embodiments from about 0.1 µm to about 25 µm, in some embodiments from about 0.5 µm to about 20 µm, and in some embodiments from about 1 µm to about 10 µm. Another morphological feature relates to the volume content of the domains within the thermoplastic composition. Volume content refers to the average percent volume occupied by the dispersed domains of a given unit volume of the composition, which can be defined to be 1 cubic centimeter (cm$^3$). To provide enhanced toughening, the average volume content of the domains is typically from about 3% to about 20% per cm$^3$, in some embodiments from about 5% to about 15%, and in some embodiments, from about 6% to about 12% per cubic centimeter of the composition.

The melt flow rate, glass transition temperature, and melting temperature of the resulting thermoplastic composition may still be somewhat similar to that of polylactic acid. For example, the melt flow rate of the composition (on a dry basis) may be from about 0.1 to about 40 grams per 10 minutes, in some embodiments from about 0.5 to about 20 grams per 10 minutes, and in some embodiments, from about 5 to about 15 grams per 10 minutes, determined at a load of 2160 grams and at a temperature of 190° C. Likewise, the thermoplastic composition may have a $T_g$ of from about 50° C. to about 80° C., and in some embodiments, from about 55° C. to about 65° C., and a melting point of from about 150° C. to about 250° C., and in some embodiments, from about 160° C. to about 220° C.

III. Fiber Formation

Fibers formed from the blended thermoplastic composition may generally have any desired configuration, including monocomponent and multicomponent (e.g., sheath-core configuration, side-by-side configuration, segmented pie configuration, island-in-the-sea configuration, and so forth). In some embodiments, the fibers may contain one or more additional polymers as a component (e.g., bicomponent) or constituent (e.g., biconstituent) to further enhance strength and other mechanical properties. For instance, the thermoplastic composition may form a sheath component of a sheath/core bicomponent fiber, while an additional polymer may form the core component, or vice versa. The additional polymer may be a thermoplastic polymer that is not generally considered biodegradable, such as polyolefins, e.g., polyethylene, polypropylene, polybutylene, and so forth; polytetrafluoroethylene; polyesters, e.g., polyethylene terephthalate, and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; and polyurethanes. More desirably, however, the additional polymer is biodegradable, such as aliphatic polyesters, such as polyesteramides, modified polyethylene terephthalate, polyglycolic acid, polyalkylene carbonates (such as polyethylene carbonate), polyhydroxyalkanoates (PHA), polyhydroxybutyrates (PHB), polyhydroxyvalerates (PHV), polyhydroxybutyrate-hydroxyvalerate copolymers (PHBV), and polycaprolactone, and succinate-based aliphatic polymers (e.g., polybutylene succinate, polybutylene succinate adipate, and polyethylene succinate); aromatic polyesters; or other aliphatic-aromatic copolyesters.

Any of a variety of processes may be used to form fibers in accordance with the present invention. For example, the thermoplastic composition described above may be extruded through a spinneret, quenched, and drawn into the vertical passage of a fiber draw unit. Once formed, the fibers may then be cut to form staple fibers having an average fiber length in the range of from about 3 to about 80 millimeters, in some embodiments from about 4 to about 65 millimeters, and in some embodiments, from about 5 to about 50 millimeters. The staple fibers may then be incorporated into a nonwoven web as is known in the art, such as bonded carded webs, through-air bonded webs, etc. The fibers may also be deposited onto a foraminous surface to form a nonwoven web.

Referring to FIG. 1, for example, one embodiment of a method for forming fibers is shown in more detail. In this particular embodiment, the polylactic acid/toughening additive blend is fed into an extruder 12 from a hopper 14. The blend may be provided to the hopper 14 using any conventional technique. Regardless, it is generally desired that the blend have a low moisture content to minimize hydrolytic degradation of the polylactic acid, such as about 300 parts per million ("ppm") or less, in some embodiments about 200 ppm or less, in some embodiments from about 1 to about 100 ppm. Such moisture contents may be achieved by drying, such as at a temperature of from about 50° C. to about 100° C., and in some embodiments, from about 70° C. to about 80° C.

The extruder 12 is heated to a temperature sufficient to extrude the melted polymer. The extruded composition is then passed through a polymer conduit 16 to a spinneret 18. For example, the spinneret 18 may include a housing containing a spin pack having a plurality of plates stacked one on top of each other and having a pattern of openings arranged to create flow paths for directing polymer components. The spinneret 18 also has openings arranged in one or more rows. The openings form a downwardly extruding curtain of filaments when the polymers are extruded therethrough. The process 10 also employs a quench blower 20 positioned adjacent the curtain of fibers extending from the spinneret 18. Air from the quench air blower 20 quenches the fibers extending from the spinneret 18. The quench air may be directed from one side of the fiber curtain as shown in FIG. 1 or both sides of the fiber curtain.

After quenching, the fibers are drawn into the vertical passage of a fiber draw unit 22. Fiber draw units or aspirators for use in melt spinning polymers are well-known in the art. Suitable fiber draw units for use in the process of the present invention include a linear fiber aspirator of the type shown in U.S. Pat. Nos. 3,802,817 and 3,423,255, which are incorporated herein in their entirety by reference thereto for all relevant purposes. The fiber draw unit 22 generally includes an elongated vertical passage through which the fibers are drawn by aspirating air entering from the sides of the passage and flowing downwardly through the passage. A heater or blower 24 supplies aspirating air to the fiber draw unit 22. The aspirating air draws the fibers and ambient air through the fiber draw unit 22. The flow of gas causes the fibers to draw or attenuate which increases the molecular orientation or crystallinity of the polymers forming the fibers. The fibers are deposited through the outlet opening of the fiber draw unit 22 and onto a godet roll 42.

Due to the increased toughness of the fibers of the present invention, high draw ratios may be employed in the present invention without resulting in fracture. The draw ratio is the linear speed of the fibers after drawing (e.g., linear speed of the godet roll 42 or a foraminous surface (not shown) divided by the linear speed of the fibers after extrusion. For example, the draw ratio may be calculated in certain embodiments as follows:

$$\text{Draw Ratio}=A/B$$

wherein,

A is the linear speed of the fiber after drawing (i.e., godet speed) and is directly measured; and B is the linear speed of the extruded fiber and can be calculated as follows:

$$\text{Extruder linear fiber speed}=C/(25*\pi*D*E^2)$$

wherein,

C is the throughput through a single hole (grams per minute);

D is the melt density of the polymer (grams per cubic centimeter); and

E is the diameter of the orifice (in centimeters) through which the fiber is extruded. In certain embodiments of the present invention, the draw ratio may be from about 200:1 to about 8500:1, in some embodiments from about 500:1 to about 7500:1, and in some embodiments, from about 1000:1 to about 6000:1. If desired, the fibers collected on the godet roll 42 may optionally be subjected to additional in line processing and/or converting steps (not shown) as will be understood by those skilled in the art. For example, staple fibers may be formed by "cold drawing" the collected fibers at a temperature below their softening temperature to the desired diameter, and thereafter crimping, texturizing, and/or and cutting the fibers to the desired fiber length.

Regardless of the particular manner in which they are formed, the present inventors have discovered that fiber drawing significantly increases the axial dimension of the dispersed discrete domains so that they have a generally linear, elongated shape. As shown in FIG. 2B, for example, the drawn domains 120 have an elongated shape in which the axial dimension is substantially greater than that of the elliptical domains (FIG. 2A). For example, the elongated domains may have an axial dimension that is about 10% or more, in some embodiments from about 50% to about 1000%, and in some embodiments, from about 100% to about 500% greater than the axial dimension of the domains prior to fiber drawing. The axial dimension after fiber drawing may, for instance, range from about 5 μm to about 400 μm, in some embodiments from about 10 μm to about 350 μm, and in some embodiments from about 20 μm to about 250 μm. The domains may also be relatively thin and thus have a small dimension in a direction orthogonal to the axial dimension (i.e., cross-sectional dimension). For instance, the cross-sectional dimension may be from about 0.02 to about 75 micrometers, in some embodiments from about 0.1 to about 40 micrometers, and in some embodiments, from 0.4 to about 20 micrometers in length. This may result in an aspect ratio for the domains (the ratio of the axial dimension to the cross-sectional dimension) of from about 3 to about 200, in some embodiments from about 5 to about 100, and in some embodiments, from about 5 to about 50.

The presence of these elongated domains is indicative of the ability of the thermoplastic composition to absorb energy imparted during fiber drawing. In this manner, the composition is not as brittle as the neat polymer and thus can release upon the application of strain, rather than fracture. By releasing under strain, the polymer may continue to function as a load bearing member even after the fiber has exhibited substantial elongation. In this regard, the fibers of the present invention are capable of exhibiting improved "peak elongation" properties, i.e., the percent elongation of the fiber at its peak load. For example, the fibers of the present invention may exhibit a peak elongation of about 25% or more, in some embodiments about 30% or more, in some embodiments from about 40% to about 350%, and in some embodiments, from about 50% to about 250%. Such elongations may be achieved for fibers having a wide variety of average diameters, such as those ranging from about 0.1 to about 50 micrometers, in some embodiments from about 1 to about 40 micrometers, in some embodiments from about 2 to about 25 micrometers, and in some embodiments, from about 5 to about 15 micrometers.

While possessing the ability to extend under strain, the fibers of the present invention can also remain relatively strong. One parameter that is indicative of the relative strength of the fibers of the present invention is "tenacity", which indicates the tensile strength of a fiber expressed as force per unit linear density. For example, the fibers of the present invention may have a tenacity of from about 0.75 to about 6.0 grams-force ("$g_f$") per denier, in some embodiments from about 1.0 to about 4.5 $g_f$ per denier, and in some embodiments, from about 1.5 to about 4.0 $g_f$ per denier. The denier of the fibers may vary depending on the desired application. Typically, the fibers are formed to have a denier per filament (i.e., the unit of linear density equal to the mass in grams per 9000 meters of fiber) of less than about 6, in some embodiments less than about 3, and in some embodiments, from about 0.5 to about 3.

If desired, the fibers of the present invention may also be formed into a coherent web structure by randomly depositing the fibers onto a forming surface (optionally with the aid of a vacuum) and then bonding the resulting web using any known technique. For example, an endless foraminous forming surface may be positioned below the fiber draw unit and receive the fibers from an outlet opening. A vacuum may be positioned below the forming surface to draw the fibers and consolidate the unbonded nonwoven web. Once formed, the nonwoven web may then be bonded using any conventional technique, such as with an adhesive or autogenously (e.g., fusion and/or self-adhesion of the fibers without an applied external adhesive). Autogenous bonding, for instance, may be achieved through contact of the fibers while they are semi-molten or tacky, or simply by blending a tackifying resin and/or solvent with the polylactic acid(s) used to form the fibers. Suitable autogenous bonding techniques may include ultrasonic bonding, thermal bonding, through-air bonding, calendar bonding, and so forth. For example, the web may be further bonded or embossed with a pattern by a thermo-mechanical process in which the web is passed between a heated smooth anvil roll and a heated pattern roll. The pattern roll may have any raised pattern which provides the desired web properties or appearance. Desirably, the pattern roll defines a raised pattern which defines a plurality of bond locations which define a bond area between about 2% and 30% of the total area of the roll. Exemplary bond patterns include, for instance, those described in U.S. Pat. No. 3,855,046 to Hansen et al., U.S. Pat. No. 5,620,779 to Levy et al., U.S. Pat. No. 5,962,112 to Haynes et al., U.S. Pat. No. 6,093,665 to Sayovitz et al., as well as U.S. Design Pat. No. 428,267 to Romano et al.; U.S. Pat. No. 390,708 to Brown; U.S. Pat. No. 418,305 to Zander, et al.; U.S. Pat. No. 384,508 to Zander, et al.; U.S. Pat. No. 384,819 to Zander, et al.; U.S. Pat. No. 358,035 to Zander, et al.; and U.S. Pat. No. 315,990 to Blenke, et al., all of which are incorporated herein in their entirety by reference thereto for all purposes. The pressure between the rolls may be from about 5 to about 2000 pounds per lineal inch. The pressure between the rolls and the temperature of the rolls is balanced to obtain desired web properties or appearance while maintaining cloth like properties. As is well known to those skilled in the art, the temperature and pressure required may vary depending upon many factors including but not limited to, pattern bond area, polymer properties, fiber properties and nonwoven properties.

In addition to spunbond webs, a variety of other nonwoven webs may also be formed from the thermoplastic composition in accordance with the present invention, such as meltblown webs, bonded carded webs, wet-laid webs, airlaid webs, coform webs, hydraulically entangled webs, etc. For example, the thermoplastic composition may be extruded through a plurality of fine die capillaries into a converging high velocity gas (e.g., air) streams that attenuate the fibers to reduce their diameter. Thereafter, the meltblown fibers are carried by the high velocity gas stream and are deposited on a collecting surface to form a web of randomly dispersed meltblown fibers. Alternatively, the polymer may be formed into a carded web by placing bales of fibers formed from the thermoplastic composition into a picker that separates the fibers. Next, the fibers are sent through a combing or carding unit that further breaks apart and aligns the fibers in the machine direction so as to form a machine direction-oriented fibrous nonwoven web. Once formed, the nonwoven web is typically stabilized by one or more known bonding techniques.

If desired, the nonwoven web may also be a composite that contains a combination of the thermoplastic composition fibers and other types of fibers (e.g., staple fibers, filaments, etc). For example, additional synthetic fibers may be utilized, such as those formed from polyolefins, e.g., polyethylene, polypropylene, polybutylene, and so forth; polytetrafluoroethylene; polyesters, e.g., polyethylene terephthalate and so forth; polyvinyl acetate; polyvinyl chloride acetate; polyvinyl butyral; acrylic resins, e.g., polyacrylate, polymethylacrylate, polymethylmethacryfate, and so forth; polyamides, e.g., nylon; polyvinyl chloride; polyvinylidene chloride; polystyrene; polyvinyl alcohol; polyurethanes; polylactic acid; etc. If desired, biodegradable polymers, such as poly(glycolic acid) (PGA), poly(lactic acid) (PLA), poly(β-malic acid) (PMLA), poly(δ-caprolactone) (PCL), poly(p-dioxanone) (PDS), poly(butylene succinate) (PBS), and poly(3-hydroxybutyrate) (PHB), may also be employed. Some examples of known synthetic fibers include sheath-core bicomponent fibers available from KoSa Inc. of Charlotte, N.C. under the designations T-255 and T-256, both of which use a polyolefin sheath, or T-254, which has a low melt co-polyester sheath. Still other known bicomponent fibers that may be used include those available from the Chisso Corporation of Moriyama, Japan or Fibervisions LLC of Wilmington, Del. Polylactic acid staple fibers may also be employed, such as those commercially available from Far Eastern Textile, Ltd. of Taiwan.

The composite may also contain pulp fibers, such as high-average fiber length pulp, low-average fiber length pulp, or mixtures thereof. One example of suitable high-average length fluff pulp fibers includes softwood kraft pulp fibers. Softwood kraft pulp fibers are derived from coniferous trees and include pulp fibers such as, but not limited to, northern, western, and southern softwood species, including redwood, red cedar, hemlock, Douglas fir, true firs, pine (e.g., southern pines), spruce (e.g., black spruce), bamboo, combinations thereof, and so forth. Northern softwood kraft pulp fibers may be used in the present invention. An example of commercially available southern softwood kraft pulp fibers suitable for use in the present invention include those available from Weyerhaeuser Company with offices in Federal Way, Wash. under the trade designation of "NF-405." Another suitable pulp for use in the present invention is a bleached, sulfate wood pulp containing primarily softwood fibers that is available from Bowater Corp. with offices in Greenville, S.C. under the trade name CoosAbsorb S pulp. Low-average length fibers may also be used in the present invention. An example of suitable low-average length pulp fibers is hardwood kraft pulp fibers. Hardwood kraft pulp fibers are derived from deciduous trees and include pulp fibers such as, but not limited to, eucalyptus, maple, birch, aspen, etc. Eucalyptus kraft pulp fibers may be particularly desired to increase softness, enhance brightness, increase opacity, and change the pore structure of the sheet to increase its wicking ability. Bamboo or cotton fibers may also be employed.

Nonwoven composites may be formed using a variety of known techniques. For example, the nonwoven composite may be a "coform material" that contains a mixture or stabilized matrix of the thermoplastic composition fibers and an absorbent material. As an example, coform materials may be made by a process in which at least one meltblown die head is arranged near a chute through which the absorbent materials are added to the web while it is forming. Such absorbent materials may include, but are not limited to, pulp fibers, superabsorbent particles, inorganic and/or organic absorbent materials, treated polymeric staple fibers, and so forth. The relative percentages of the absorbent material may vary over a wide range depending on the desired characteristics of the nonwoven composite. For example, the nonwoven composite may contain from about 1 wt. % to about 60 wt. %, in some embodiments from 5 wt. % to about 50 wt. %, and in some embodiments, from about 10 wt. % to about 40 wt. % thermoplastic composition fibers. The nonwoven composite may likewise contain from about 40 wt. % to about 99 wt. %, in some embodiments from 50 wt. % to about 95 wt. %, and in some embodiments, from about 60 wt. % to about 90 wt. % absorbent material. Some examples of such coform materials are disclosed in U.S. Pat. No. 4,100,324 to Anderson, et al.; U.S. Pat. No. 5,284,703 to Everhart, et al.; and U.S. Pat. No. 5,350,624 to Georqer, et al.; which are incorporated herein in their entirety by reference thereto for all purposes.

Nonwoven laminates may also be formed in the present invention in which one or more layers are formed from the thermoplastic composition. For example, the nonwoven web of one layer may be a spunbond that contains the thermoplastic composition, while the nonwoven web of another layer contains thermoplastic composition, other biodegradable polymer(s), and/or any other polymer (e.g., polyolefins). In one embodiment, the nonwoven laminate contains a meltblown layer positioned between two spunbond layers to form a spunbond /meltblown/spunbond ("SMS") laminate. If desired, the spunbond layer(s) may be formed from the thermoplastic composition. The meltblown layer may be formed from the thermoplastic composition, other biodegradable polymer(s), and/or any other polymer (e.g., polyolefins). Various techniques for forming SMS laminates are described in U.S. Pat. No. 4,041,203 to Brock et al.; U.S. Pat. No. 5,213,881 to Timmons, et al.; U.S. Pat. No. 5,464,688 to Timmons, et al.; U.S. Pat. No. 4,374,888 to Bornslaeger; U.S. Pat. No. 5,169,706 to Collier, et al.; and U.S. Pat. No. 4,766,029 to Brock et al., as well as U.S. Patent Application Publication No. 2004/0002273 to Fitting, et al., all of which are incorporated herein in their entirety by reference thereto for all purposes. Of course, the nonwoven laminate may have other configuration and possess any desired number of meltblown and spunbond layers, such as spunbond/meltblown/meltblown/spunbond laminates ("SMMS"), spunbond/meltblown laminates ("SM"), etc. Although the basis weight of the nonwoven laminate may be tailored to the desired application, it generally ranges from about 10 to about 300 grams per square meter ("gsm"), in some embodiments from about 25 to about 200 gsm, and in some embodiments, from about 40 to about 150 gsm.

If desired, the nonwoven web or laminate may be applied with various treatments to impart desirable characteristics. For example, the web may be treated with liquid-repellency additives, antistatic agents, surfactants, colorants, antifogging agents, fluorochemical blood or alcohol repellents, lubricants, and/or antimicrobial agents. In addition, the web may be subjected to an electret treatment that imparts an electrostatic charge to improve filtration efficiency. The charge may include layers of positive or negative charges trapped at or near the surface of the polymer, or charge clouds stored in the bulk of the polymer. The charge may also include polarization charges that are frozen in alignment of the dipoles of the molecules. Techniques for subjecting a fabric to an electret treatment are well known by those skilled in the art. Examples of such techniques include, but are not limited to, thermal, liquid-contact, electron beam and corona discharge techniques. In one particular embodiment, the electret treatment is a corona discharge technique, which involves subjecting the laminate to a pair of electrical fields that have opposite polarities. Other methods for forming an electret material are described in U.S. Pat. No. 4,215,682 to Kubik, et al.; U.S. Pat. No. 4,375,718 to Wadsworth; U.S. Pat. No. 4,592,815 to Nakao; U.S. Pat. No. 4,874,659 to Ando; U.S. Pat. No. 5,401,446 to Tsai, et al.; U.S. Pat. No. 5,883,026 to Reader, et al.; U.S. Pat. No. 5,908,598 to Rousseau, et al.; U.S. Pat. No. 6,365,088 to Knight, et al., which are incorporated herein in their entirety by reference thereto for all purposes.

IV. Articles

The nonwoven web may be used in a wide variety of applications. For example, the web may be incorporated into a "medical product", such as gowns, surgical drapes, facemasks, head coverings, surgical caps, shoe coverings, sterilization wraps, warming blankets, heating pads, and so forth. Of course, the nonwoven web may also be used in various other articles. For example, the nonwoven web may be incorporated into an "absorbent article" that is capable of absorbing water or other fluids. Examples of some absorbent articles include, but are not limited to, personal care absorbent articles, such as diapers, training pants, absorbent underpants, incontinence articles, feminine hygiene products (e.g., sanitary napkins), swim wear, baby wipes, mitt wipe, and so forth; medical absorbent articles, such as garments, fenestration materials, underpads, bedpads, bandages, absorbent drapes, and medical wipes; food service wipers; clothing articles; pouches, and so forth. Materials and processes suitable for forming such articles are well known to those skilled in the art. Absorbent articles, for instance, typically include a substantially liquid-impermeable layer (e.g., outer cover), a liquid-permeable layer (e.g., bodyside liner, surge layer, etc.), and an absorbent core. In one embodiment, for example, a nonwoven web formed according to the present invention may be used to form an outer cover of an absorbent article. If desired, the nonwoven web may be laminated to a liquid-impermeable film that is either vapor-permeable or vapor-impermeable.

The present invention may be better understood with reference to the following examples. In each of the Examples below, polylactic acid was dried in a dessicant dryer at a temperature of about 77° C. (to a moisture content of below 300 ppm) prior to blending with the toughening additive. The resulting blend was also dried in a dessicant dryer at a temperature of from 125° F. to 150° F. (to a moisture content of below 300 ppm, and optionally 200 ppm) prior to fiber spinning.

The following samples refer to polylactic acid (PLA) blends that contain toughening additives. These blends are referred to by sample number in Examples 1-2 as follows:

Sample 1—100 wt. % PLA 6021D. PLA 6021D is polylactic acid (Natureworks) having a melt flow rate of 10 g/10 min at 190° C.

Sample 2—90 wt. % PLA 6201D and 10 wt. % Escorene™ Ultra 7720. Escorene™ Ultra 7720 is an ethylene vinyl acetate ("EVA") resin (Exxonmobil) having a melt flow rate of 150 g/10 min at 190° C. and a density of 0.946 g/cm³.

Sample 3—92.5 wt. % PLA 62010 and 7.5 wt. % Escorene™ Ultra 7720.

Sample 4—90 wt. % PLA 6201D and 10 wt. % Pearlbond® 123. Pearlbond® 123 is a thermoplastic polycaprolactone polyurethane elastomer (Merquinsa) having a melt flow rate of 70 to 90 g/10 min at 170° C.

Sample 5—90 wt. % PLA 6201D and 10 wt. % Affinity™ EG 8185. Affinity™ EG 8185 is an α-olefin/ethylene copolymer plastomer (Dow Chemical) having a melt flow rate of 30 g/10 min at 190° C. and a density of 0.885 g/cm³.

Sample 6—90 wt. % PLA 62010 and 10 wt. % Affinity™ EG 8200. Affinity™ EG 8200 is an octene/ethylene copolymer plastomer (Dow Chemical) having a melt flow rate of 5 g/10 min at 190° C. and a density of 0.870 g/cm³.

Sample 7—90 wt. % PLA 6201D and 10 wt. % Affinity™ GA 1950. Affinity™ GA 1950 is an octene/ethylene copolymer plastomer (Dow Chemical) having a melt flow rate of 500 g/10 min at 190° C. and a density of 0.874 g/cm³.

Sample 8—90 wt. % PLA 6201D and 10 wt. % Pearlthane™ Clear 15N80. Pearlthane™ Clear 15N80 is a thermoplastic polyether-based polyurethane elastomer (Merquinsa) having a melt flow rate of 10 to 90 g/10 min at 190° C.

Sample 9—92.5 wt. % PLA 6201D and 7.5 wt. % Escorene™ Ultra LD 755.12. Escorene™ Ultra LD 755.12 is an ethylene vinyl acetate ("EVA") resin (Exxonmobil) having a melt flow rate of 25 g/10 min at 190° C. and a density of 0.952 g/cm³.

Sample 10—92.5 wt. % PLA 6201D and 7.5 wt. % Affinity™ EG 8200.

Sample 11—92.5 wt. % PLA 6201D and 7.5 wt. % Pearlbond® 123.

EXAMPLE 1

The ability to form a blend of polylactic acid and a toughening additive was demonstrated. More particularly, a co-rotating, twin-screw extruder (ZSK-30, diameter of 30 mm, length of 1328 millimeters) was employed for compounding that was manufactured by Werner and Pfleiderer Corporation of Ramsey, N.J. The extruder possessed 14 zones, numbered consecutively 1-14 from the feed hopper to the die. The first barrel #1 received the resins via two gravimetric feeders (one for PLA and one for toughening additive) at a total throughput of 20 pounds per hour. The die used to extrude the resin had 3 die openings (6 millimeters in diameter) that were separated by 4 millimeters. The extruder was run at speed of 160 revolutions per minute. Upon formation, the extruded resin was cooled on a fan-cooled conveyor belt and formed into pellets by a Conair pelletizer. The compounding conditions are shown below in Table 1.

TABLE 1

| | | | | | Compounding Conditions | | | | | | |
|---|---|---|---|---|---|---|---|---|---|---|---|
| Sample # | Speed (rpm) | $T_1$ (° C.) | $T_2$ (° C.) | $T_3$ (° C.) | $T_4$ (° C.) | $T_5$ (° C.) | $T_6$ (° C.) | $T_7$ (° C.) | $T_{melt}$ (° C.) | $P_{melt}$ (psi) | Torque (%) |
| 3 | 150 | 174 | 182 | 190 | 184 | 183 | 185 | 172 | 176 | 90-100 | 46-54 |
|   | 150 | 172 | 180 | 188 | 185 | 181 | 186 | 174 | 178 | 80-100 | 45-52 |
| 2 | 160 | 171 | 180 | 194 | 188 | 192 | 178 | 174 | 180 | 100 | 45-53 |
|   | 160 | 169 | 178 | 190 | 189 | 190 | 181 | 171 | 178 | 100 | 45-53 |
| 4 | 160 | 170 | 187 | 192 | 190 | 191 | 186 | 175 | 181 | 120 | 52-56 |
|   | 160 | 171 | 181 | 190 | 194 | 190 | 181 | 170 | 178 | 120 | 52-56 |
| 5 | 160 | 171 | 182 | 192 | 190 | 194 | 181 | 170 | 173 | 130 | 48-52 |
|   | 160 | 168 | 181 | 190 | 188 | 192 | 178 | 174 | 178 | 130 | 48-52 |
| 6 | 160 | 173 | 181 | 175 | 186 | 188 | 185 | 169 | 173 | 140 | 50-55 |
|   | 160 | 170 | 180 | 188 | 192 | 191 | 188 | 171 | 175 | 140 | 50-56 |
| 7 | 160 | 171 | 181 | 188 | 188 | 190 | 186 | 168 | 175 | 110 | 37-42 |
|   | 160 | 170 | 176 | 189 | 191 | 191 | 184 | 170 | 176 | 110 | 37-42 |
| 8 | 160 | 169 | 187 | 194 | 196 | 191 | 181 | 170 | 176 | 150 | 65-71 |
|   | 160 | 170 | 184 | 191 | 192 | 190 | 181 | 172 | 178 | 150 | 65-71 |
| 9 | 150 | 150 | 172 | 186 | 188 | 184 | 182 | 185 | 181 | 187 | 57-62 |
|   | 150 | 150 | 169 | 181 | 186 | 185 | 188 | 185 | 175 | 181 | 54-60 |
| 10 | 160 | 150 | 170 | 181 | 189 | 186 | 185 | 185 | 182 | 184 | 52-58 |
|   | 160 | 150 | 171 | 184 | 186 | 184 | 182 | 183 | 180 | 182 | 51-58 |
| 11 | 160 | 150 | 173 | 182 | 185 | 183 | 181 | 186 | 175 | 185 | 57-63 |
|   | 160 | 150 | 169 | 180 | 189 | 185 | 186 | 184 | 173 | 182 | 56-63 |

The melt flow rate and moisture content of several of the resulting thermoplastic blends were then determined. The results of are shown below.

TABLE 2

MFR and Moisture Content

| Sample # | Melt Flow Rate (g/10 min @ 190° C., 2.16 kg) | Moisture (ppm) |
|---|---|---|
| 2 | 16.0 | 214 |
| 3 | 20.3 | 148 |
| 4 | 16.4 | 116 |

TABLE 2-continued

MFR and Moisture Content

| Sample # | Melt Flow Rate (g/10 min @ 190° C., 2.16 kg) | Moisture (ppm) |
|---|---|---|
| 5 | 12.4 | 98 |

As indicated, the moisture content was higher than 100% PLA (typically <100 ppm), but lower than the moisture content typically seen when conventional plasticizers (e.g., polyethylene glycol) are used—i.e., 300-500 ppm.

Figure 3:
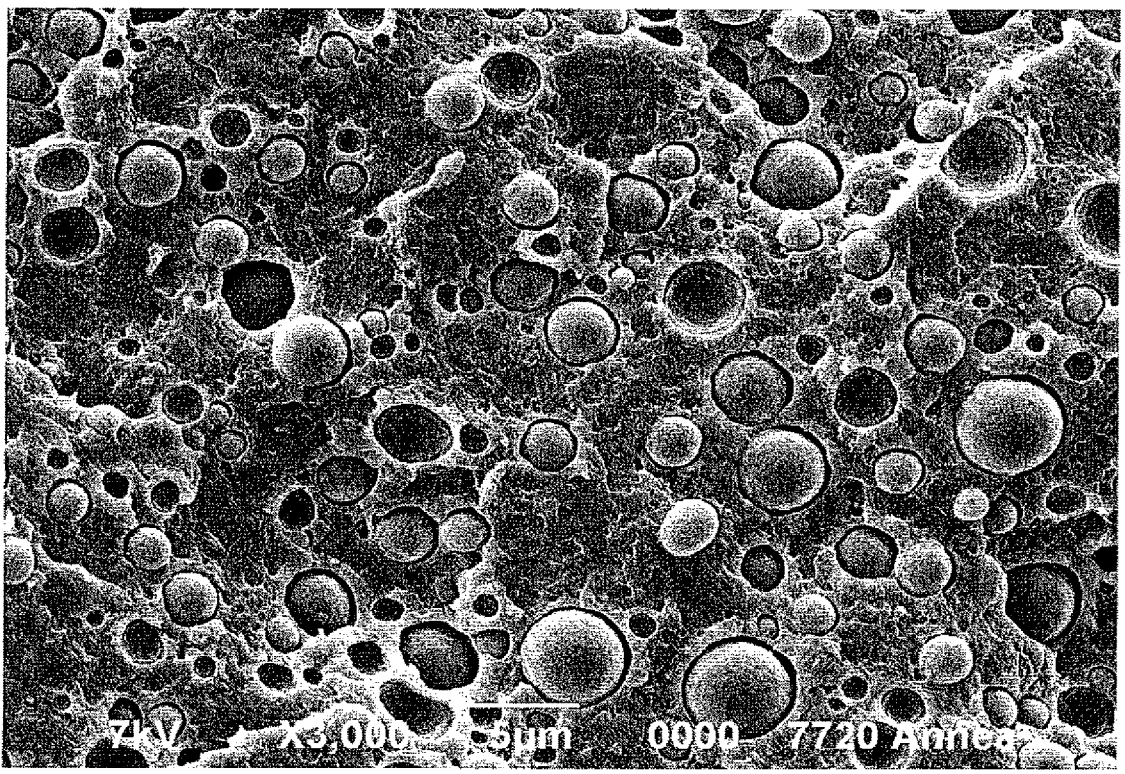
FIG. 3 is an SEM photograph (7 kV, 3,000×) of a cross-section of a polymer blend (Sample 2) of Example 1.
Figure 4:
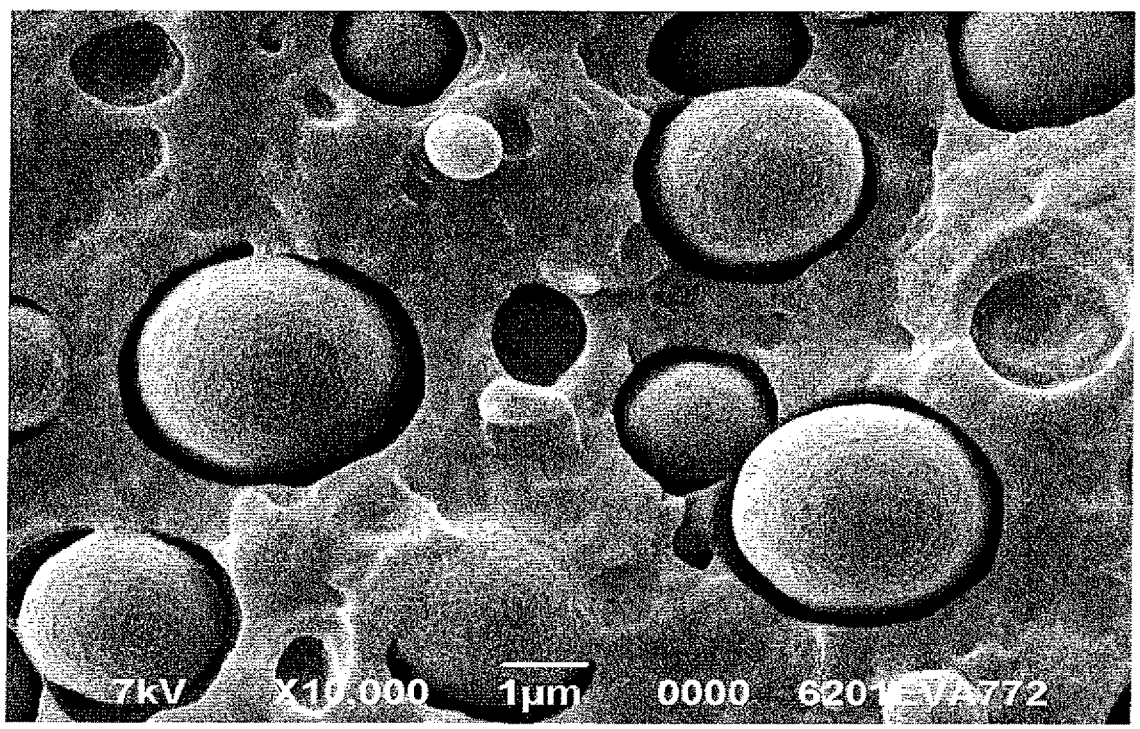
FIG. 4 is an SEM photograph (7 kV, 10,000×) of a cross-section of a polymer blend (Sample 2) of Example 1.

SEM photographs were also taken of a cross-section of Sample 2 after being annealed for 10 minutes at about 85° C. The results are shown in FIGS. 3-4. As shown, the composition contained a plurality of generally spherical domains of the polymeric toughening additive. The domains had an axial dimension of about 1 μm to about 3 μm.

EXAMPLE 2

The ability to form fibers from a blend of the polylactic acid and toughening additive was demonstrated. More particularly, several of the blends of Example 1 (Samples 2, 3, 4, and 5) were fed into a co-rotating, twin-screw extruder (ZSK-30, diameter of 30 mm, length of 1328 millimeters) was employed for compounding that was manufactured by Werner and Pfleiderer Corporation of Ramsey, N.J. The extruder possessed 14 zones, numbered consecutively 1-14 from the feed hopper to the die. The first barrel #1 received the resins via gravimetric feeder at a total throughput of 20 pounds per hour. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The screw speed was 160 revolutions per minute ("rpm"). Upon formation, the extruded resin was cooled on a fan-cooled conveyor belt and formed into pellets. The pellets were then supplied to an extruder heated to a temperature of 240° C. The melt was extruded through a monocomponent spinpack (16 holes, hole size of 0.600 mm) at a rate of 0.23 grams per hole per minute to form continuous fibers which were then quenched using forced air supplied by a blower a temperature of 25° C. The continuous fibers were then mechanically drawn and collected on a godet roll, the speed of which was increased until fiber breakage. In processing the blends into fibers, heated quench was not used because heated quench led to an inability to collect fibers.

In contrast to the PLA blends, the PLA control (Sample 1) was dried at 165° F. for approximately a week before being spun into a fiber. The following table shows the parameters for fiber spinning.

TABLE 3

Fiber Spinning Conditions

| Sample # | $T_7$ (° C.) | $T_6$ (° C.) | $T_5$ (° C.) | $T_4$ (° C.) | $T_3$ (° C.) | $T_2$ (° C.) | $T_1$ (° C.) | $P_{melt}$ (psi) | Screw Speed (rpm) | $P_{control}$ (psi) | Max Godet Speed (mpm) |
|---|---|---|---|---|---|---|---|---|---|---|---|
| 1 | 240 | 240 | 240 | 240 | 240 | 230 | 190 | 270 | 2.5 | 600 | 3000 |
| 2 | 240 | 240 | 240 | 240 | 240 | 230 | 190 | 175 | 47.0 | 600 | 1800 |
| 3 | 240 | 240 | 240 | 240 | 240 | 230 | 190 | 175 | 34.9 | 600 | 2300 |
| 4 | 238 | 240 | 240 | 240 | 240 | 230 | 190 | 185 | 58.0 | 600 | 1500 |
| 5 | 240 | 240 | 240 | 240 | 240 | 230 | 190 | 215 | 42.0 | 600 | 2300 |

Sample 2 (PLA with 10% EVA 7720) was difficult to process due to the fluctuation in extruder pressure, which caused the screw speed to range from 36-44 rpm. As such, samples could only be collected at 1800 mpm (2789 draw down ratio) before breaking. Similarly, Sample 4 (PLA with 10% PB 123) also increased the screw rpm. During processing, screw speeds reached about 60 rpm to maintain the 600 psi extruder control pressure, and fibers could only be collected at 1500 mpm (2324 draw down ratio).

Sample 3 (PLA with 7.5% EVA 7720) was more stable and could be collected at 2300 mpm. Sample 5 (PLA with 10% Affinity EG8185) had the highest outlet pressure but was stable and was able to be collected at 2300 mpm (3563 draw down ratio).

After all of the fibers were spun, ten (10) fibers from each of the samples were tested for various properties. The fiber samples were measured three times and averaged for the diameter. The table below shows the results from the fiber testing and also includes the throughput, godet speed, and draw ratio for the fibers.

TABLE 4

Mechanical Properties of the Fibers

| | Sample # | | | | |
|---|---|---|---|---|---|
| | 1 | 2 | 3 | 4 | 5 |
| Avg. Tenacity ($g_{force}$/denier) | 4.04 | 3.87 | 3.89 | 3.73 | 3.65 |
| Avg. Peak Elongation (%) | 25.55 | 47.34 | 34.22 | 41.55 | 36.94 |
| Avg. Diameter (μm) | 7.2 | 8.42 | 8.06 | 10.57 | 8.31 |
| Throughput (g/(hole * min)) | 0.23 | 0.23 | 0.23 | 0.23 | 0.23 |
| Godet Speed (mpm) | 3000 | 1800 | 2300 | 1500 | 2300 |

TABLE 4-continued

Mechanical Properties of the Fibers

| | Sample # | | | | |
|---|---|---|---|---|---|
| | 1 | 2 | 3 | 4 | 5 |
| Draw Ratio (%) | 4648 | 2789 | 3563 | 2324 | 3563 |
| Extrusion Temperature (° C.) | 240 | 240 | 240 | 240 | 240 |
| % Adjusted Crystallinity | 47 | 44 | 42 | 42 | 38 |
| % Total Crystallinity | 58 | 52 | 53 | 51 | 45 |

As indicated, the tenacity values for the blends (Samples 2-5) were not significantly less than that of 100 wt. % PLA and fell only by about 3% to 5%. While all of the blends showed an increase in peak elongation compared to 100% PLA (Sample 1), they also had a high level of variability. Sample 2 had the highest peak elongation in that it reached 2 to 3 times the elongation of 100% PLA. Sample 4 had the second highest level of elongation, but this sample also had the largest fibers. Samples 3 and 5 showed similar levels of elongation.

The thermal properties of the fibers were also tested. The results are set forth below.

TABLE 5

Thermal Properties of the Fibers

| | 1st Heat | | | | | 1st Cool | | | 2nd Heat | | | | |
|---|---|---|---|---|---|---|---|---|---|---|---|---|---|
| # | $T_g$ (° C.) | $T_m$ (° C.) | $\Delta T_{1/2}$ | $\Delta H_{ch}$ (J/g) | $\Delta H_f$ (J/g) | $\Delta H_{cc}$ (J/g) | $T_c$ (° C.) | $\Delta T_{1/2}$ | $T_g$ (° C.) | $T_m$ (° C.) | $\Delta T_{1/2}$ | $\Delta H_{ch}$ (J/g) | $\Delta H_f$ (J/g) |
| 1 | 55.97 | 163.46 | 6.25 | 9.81 | 53.98 | 24.84 | 91.82 | 43.99 | 59.43 | 164.69 | 5.63 | 22.12 | 44.96 |
| 2 | 56.78 | 165.61 | 3.93 | 7.431 | 48.39 | 23.25 | 96.55 | 14.02 | 59.69 | 166.09 | 5.27 | 5.267 | 40.84 |
| 3 | N/A | 165.02 | 3.91 | 7.565 | 49.52 | 36.16 | 101.35 | 25.81 | N/A | 167.22 | 8.54 | N/A | 44.04 |
| 4 | N/A | 164.55 | 5.24 | 7.852 | 47.35 | 24.94 | 96.06 | 14.07 | 51.49 | 165.47 | 5.94 | 3.309 | 42.53 |
| 5 | 60.04 | 166.16 | 5.66 | 7.049 | 42.47 | 28.54 | 96.85 | 17.35 | 56.82 | 165.39 | 5.05 | 7.438 | 49.91 |

As indicated, the glass transition temperature of the polylactic acid (Sample 1) was not significantly lowered with the addition of the toughening additive.

Figure 5:
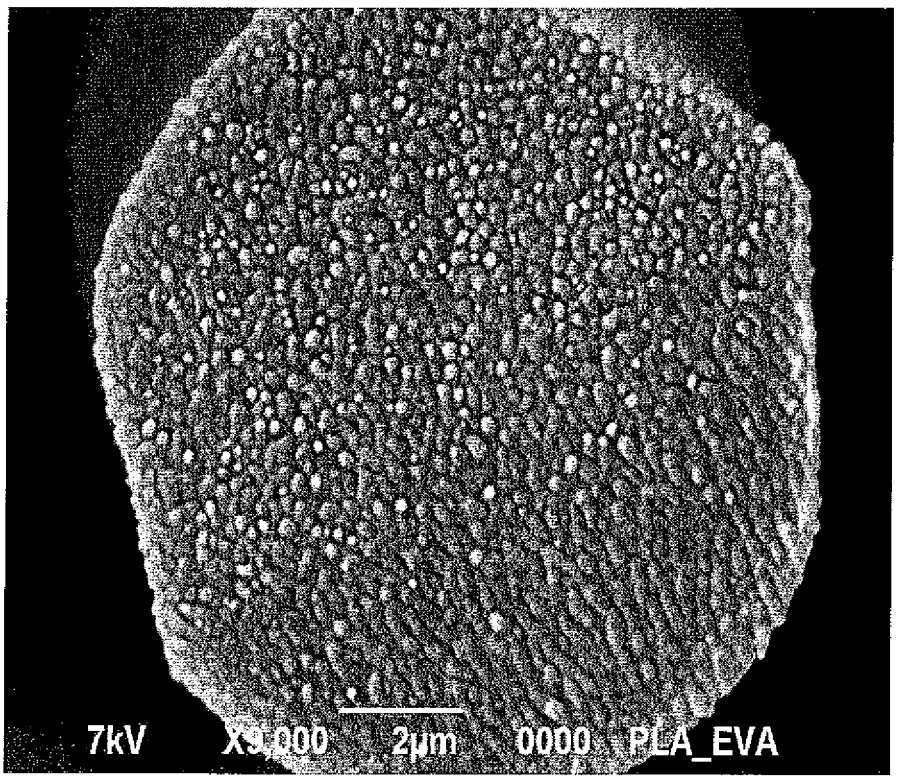
FIG. 5 is an SEM photograph (7 kV, 9,000×) of a cross-section of a fiber (Sample 2) of Example 2.
Figure 6:
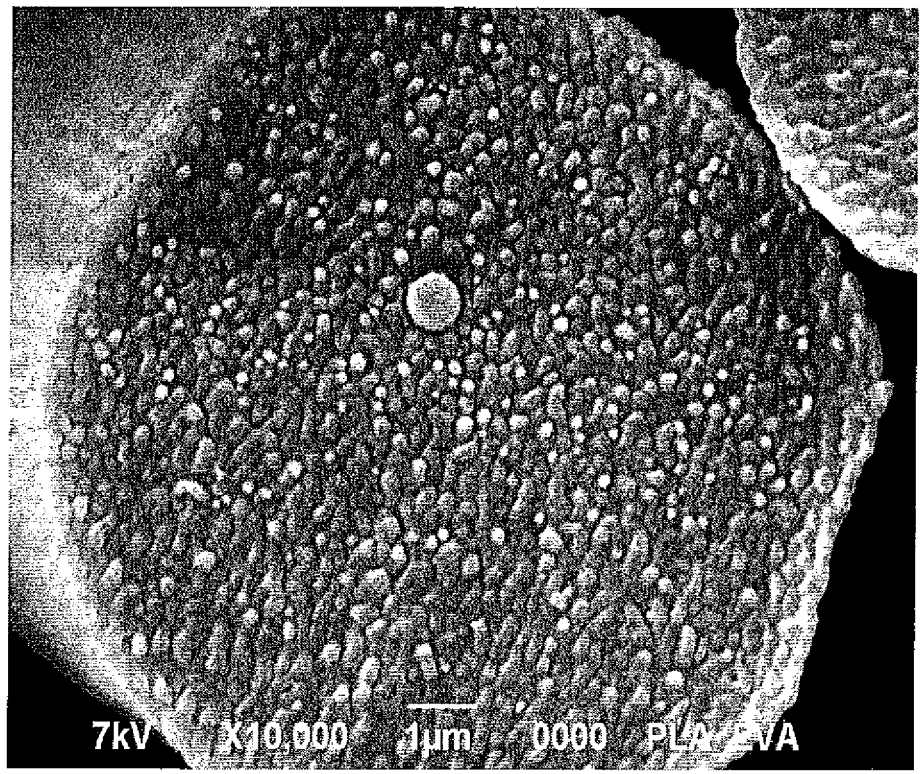
FIG. 6 is an SEM photograph (7 kV, 10,000×) of a cross-section of a fiber (Sample 2) of Example 2.
Figure 7:
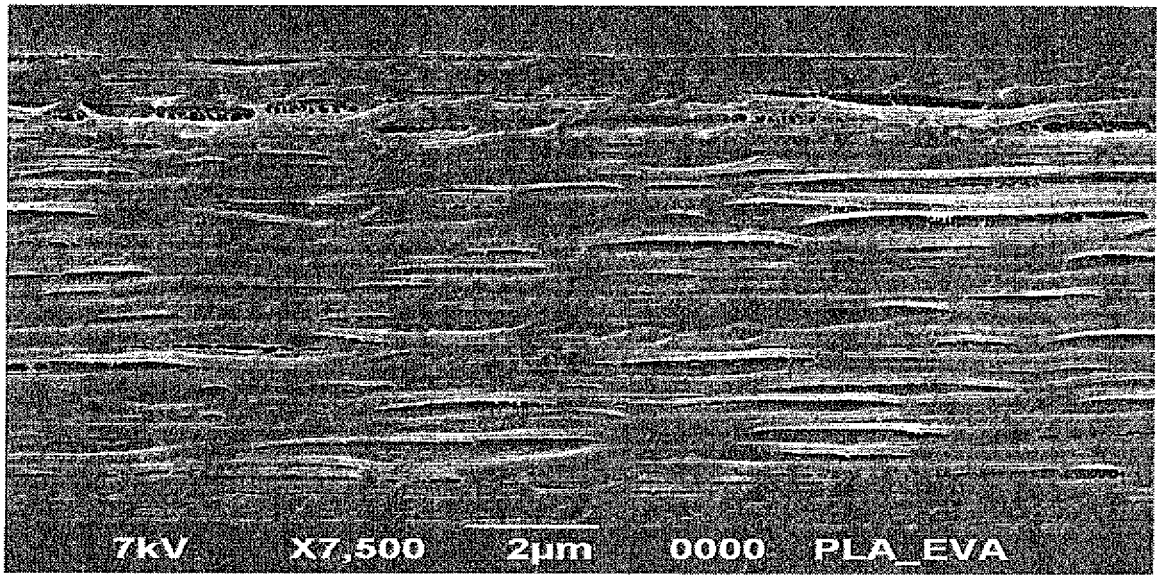
FIG. 7 is an SEM photograph (7 kV, 7,500×) of the axial dimension of a fiber (Sample 2) of Example 2.
Figure 8:
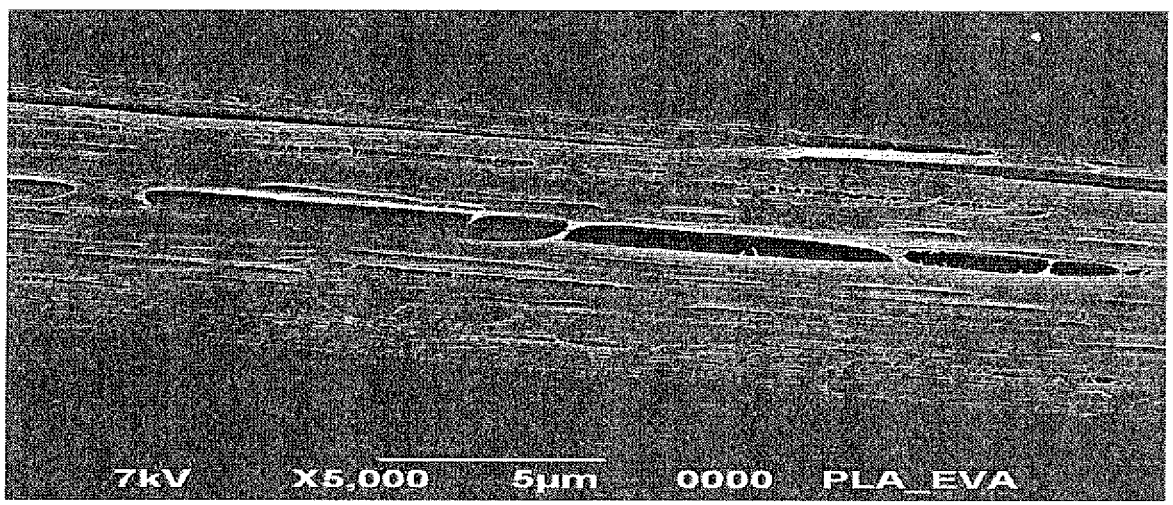
FIG. 8 is an SEM photograph (7 kV, 5,000×) of the axial dimension of a fiber (Sample 2) of Example 2.

SEM photographs were also taken of the fibers of Sample 2, both in cross-section and along the length of the fibers. The cross-sectional photographs were taken after the sample was treated with an oxygen plasma etch at 30° C. The cross-sectional images are shown in FIGS. 5-6. As shown, the polymeric toughening additive formed a nano-cylindrical dispersed phase within the polylactic acid, where the diameter or cross-sectional dimension of the domains was from about 0.25 to about 0.3 micrometers. FIGS. 7-8 likewise show the fibers along the axial dimension. As shown, the dispersed toughening additive domains are highly elongated and resulted in an aspect ratio of 10 or more.

EXAMPLE 3

The ability to form fibers from a blend of 90 wt. % polylactic acid (PLA 6201D, Natureworks®) and 10 wt. % of a toughening additive was demonstrated. The toughening additive was Vistamaxx™ 2120 (Exxonmobil), which is a polyolefin copolymer/elastomer with a melt flow rate of 29 g/10 min (190° C., 2160g) and a density of 0.866 g/cm³. The polymers were fed into a co-rotating, twin-screw extruder (ZSK-30, diameter of 30 mm, length of 1328 millimeters) for compounding that was manufactured by Werner and Pfleiderer Corporation of Ramsey, N.J. The extruder possessed 14 zones, numbered consecutively 1-14 from the feed hopper to the die. The first barrel #1 received the resins via gravimetric feeder at a total throughput of 11 pounds per hour. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The screw speed was 100 revolutions per minute ("rpm"). Upon formation, the extruded resin was cooled on a fan-cooled conveyor belt and formed into pellets. The pellets were run through the twin screw extruder for a second pass at a rate of 15 lb/hr, at a melt temperature of 200° C. and a screw speed of 200 rpm and again pelletized. The pellets were then supplied to an extruder heated to a temperature of 240° C. The throughput of the extruder was 0.20 grams per hole per minute (on a 16 hole spinpack). The melt was extruded through the spinpack to form continuous fibers which were then quenched using forced air supplied by a blower a temperature of 25° C. The continuous fibers were then drawn through a fiber drawn unit elongating the fibers and sent onto a godet roll at a speed of 2800 meters per minute ("mpm"). The resulting draw ratio was thus 4338.

EXAMPLE 4

Fibers were formed as described in Example 3, except that the toughening additive was Vistamaxx™ 2320 (Exxonmobil), which is a polyolefin copolymer/elastomer with a melt flow rate of 40 g/10 min (190° C., 2160g) and a density of 0.864 g/cm³.

EXAMPLE 5

Fibers were formed as described in Example 3, except that added to the mixture was 3 wt. % of Fusabond® MD-353D, a maleic anhydride-modified polypropylene copolymer (DuPont).

EXAMPLE 6

Fibers were formed as described in Example 4, except that added to the mixture was 3 wt. % of Fusabond® MD-353D.

EXAMPLE 7

Fibers were formed as described in Example 3, except that added to the mixture was 2 wt. % SCC4837 (Exxon 3155 PP/TiO₂, in a 50/50 ratio).

EXAMPLE 8

Fibers were formed as described in Example 4, except that added to the mixture was 2 wt. % SCC4837.

EXAMPLE 9

Fibers were formed as described in Example 3, except that added to the mixture was 2 wt. % SCC4837 and 3 wt. % of Fusabond® MD-353D.

EXAMPLE 10

Fibers were formed as described in Example 4, except that added to the mixture was 2 wt. % SCC4837 and 3 M. % of Fusabond® MD-353D (DuPont).

Ten (10) samples were made according to Examples 3-10 and then tested for tenacity and elongation. The results (average) are set forth below.

TABLE 6

Fiber Properties for Examples 3-10

| Example # | Toughening Additive | Fusabond® MD-353D (wt. %) | SCC4837 (wt. %) | Diameter (μm) | Elongation (%) | Tenacity (g/denier) | Draw Down Ratio |
|---|---|---|---|---|---|---|---|
| 3 | Vistamaxx™ 2120 | — | — | 10.94 | 55.78 | 2.21 | 4338 |
| 4 | Vistamaxx™ 2320 | — | — | 11.77 | 52.56 | 2.40 | 2324 |
| 5 | Vistamaxx™ 2120 | 2.9 | — | 9.72 | 28.97 | 1.93 | 2789 |
| 6 | Vistamaxx™ 2320 | 2.9 | — | 12.74 | 62.36 | 2.42 | 1859 |
| 7 | Vistamaxx™ 2120 | — | 2.0 | 10.22 | 40.14 | 2.03 | 4648 |
| 8 | Vistamaxx™ 2320 | — | 2.0 | 10.48 | 55.18 | 2.31 | 2324 |
| 9 | Vistamaxx™ 2120 | 2.9 | 1.9 | 11.02 | 47.34 | 1.98 | 1859 |
| 10 | Vistamaxx™ 2320 | 2.9 | 1.9 | 9.76 | 44.28 | 2.31 | 1549 |

EXAMPLE 11

The ability to form fibers from a blend of 90 wt. % polylactic acid (PLA 6201D, Natureworks®) and 10 wt. % of a toughening additive was demonstrated. The toughening additive was Escorene™ Ultra 7720. The polymers were fed into a co-rotating, twin-screw extruder (ZSK-30, diameter of 30 mm, length of 1328 millimeters) for compounding that was manufactured by Werner and Pfleiderer Corporation of Ramsey, N.J. The extruder possessed 14 zones, numbered consecutively 1-14 from the feed hopper to the die. The first barrel #1 received the resins via gravimetric feeder at a total throughput of 11 pounds per hour. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The screw speed was 100 revolutions per minute ("rpm"). Upon formation, the extruded resin was cooled on a fan-cooled conveyor belt and formed into pellets. The pellets were run through the twin screw extruder for a second pass at a rate of 15 lb/hr, at a melt temperature of 200° C. and a screw speed of 200 rpm and again pelletized. The pellets were then supplied to an extruder heated to a temperature of 230° C. The throughput of the extruder was 0.20 grams per hole per minute (on a 16 hole spinpack). The melt was extruded through the spinpack to form continuous fibers which were then quenched using forced air supplied by a blower a temperature of 25° C. The continuous fibers were then drawn through a fiber drawn unit elongating the fibers and sent onto a godet roll at a speed of 1800 meters per minute ("mpm"). The resulting draw ratio was 2789.

EXAMPLE 12

Fibers were formed as described in Example 11, except that the fibers were formed at an extrusion temperature of 210° C.

EXAMPLE 13

Fibers were formed as described in Example 3, except that the toughening additive was Escorene™ Ultra 7840E (Exxonmobil), which is an ethylene vinyl acetate ("EVA") copolymer having a melt flow rate of 43 g/10 min (190° C., 2160g) and a density of 0.955 g/cm³. Also, the pellets were extruded into fibers at a temperature of 235° C.

EXAMPLE 14

Fibers were formed as described in Example 11, except that added to the mixture was 2 wt. % SCC4837 (Exxon 3155 PP/TiO$_2$, in a 50/50 ratio). Also, the pellets were extruded into fibers at a temperature of 240° C.

EXAMPLE 15

Fibers were formed as described in Example 11, except that added to the mixture was 2 wt. % SCC4837. Also, the pellets were extruded into fibers at a temperature of 220° C.

Ten (10) samples were made according to Examples 11-15 and then tested for tenacity and elongation. The results (average) are set forth below.

TABLE 7

Fiber Properties for Examples 11-15

| Example # | Toughening Additive | SCC4837 (wt. %) | Fiber Extrusion Temp. (° C.) | Diameter (μm) | Elongation (%) | Tenacity (g/g) | Draw Down Ratio |
|---|---|---|---|---|---|---|---|
| 11 | Escorene ™ Ultra 7720 | — | 230 | 10.88 | 42.85 | 2.14 | 2789 |
| 12 | Escorene ™ Ultra 7720 | — | 210 | 12.77 | 43.73 | 2.17 | 1859 |
| 13 | Escorene ™ Ultra 7840E | — | 235 | 11.77 | 42.62 | 2.22 | 2789 |
| 14 | Escorene ™ Ultra 7720 | 2.0 | 240 | 16.62 | 65.49 | 2.47 | 2324 |
| 15 | Escorene ™ Ultra 7720 | 2.0 | 220 | 17.08 | 52.63 | 2.60 | 1549 |

EXAMPLE 16

The ability to form fibers from a blend of 90 wt. % polylactic acid (PLA 6201D, Natureworks®) and 10 wt. % of a toughening additive was demonstrated. The toughening additive was PP 3155 (Exxon Mobil), a polypropylene homopolymer. The polymers were fed into a co-rotating, twin-screw extruder (ZSK-30, diameter of 30 mm, length of 1328 millimeters) for compounding that was manufactured by Werner and Pfleiderer Corporation of Ramsey, N.J. The extruder possessed 14 zones, numbered consecutively 1-14 from the feed hopper to the die. The first barrel #1 received the resins via gravimetric feeder at a total throughput of 15 pounds per hour. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The screw speed was 100 revolutions per minute ("rpm"). Upon formation, the extruded resin was cooled on a fan-cooled conveyor belt and formed into pellets. The pellets were then supplied to an extruder heated to a temperature of 230° C. The throughput of the extruder was 0.40 grams per hole per minute (on a 16 hole spinpack). The melt was extruded through the spinpack to form continuous fibers which were then quenched using forced air supplied by a blower a temperature of 25° C. The continuous fibers were then drawn through a fiber drawn unit elongating the fibers and sent onto a godet roll at a speed of 2000 meters per minute ("mpm"). The resulting draw ratio was 3099.

EXAMPLE 17

Fibers were formed as described in Example 16, except that the fibers were formed at an extrusion temperature of 235° C. The continuous fibers were drawn onto a godet roll at a speed of 2800 meters per minute ("mpm"). The resulting draw ratio was 4338.

EXAMPLE 18

Fibers were formed as described in Example 16, except that the fibers were formed at an extrusion temperature of 240° C. The continuous fibers were drawn onto a godet roll at a speed of 2000 meters per minute ("mpm"). The resulting draw ratio was 3099.

Ten (10) samples were made according to Examples 16-18 and then tested for tenacity and elongation. The results (average) are set forth below.

TABLE 8

Fiber Properties for Examples 16-18

| Example # | Fiber Extrusion Temp. (° C.) | Diameter (μm) | Elongation (%) | Tenacity (g/g) | Draw Down Ratio |
|---|---|---|---|---|---|
| 16 | 230 | 14.06 | 65.04 | 3.38 | 3099 |
| 17 | 235 | 12.88 | 69.32 | 3.70 | 4338 |
| 18 | 240 | 12.24 | 88.76 | 2.98 | 3099 |

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A polylactic acid fiber extending in a longitudinal direction, the fiber comprising
a thermoplastic composition that contains a plurality of discrete domains dispersed within a continuous phase, the discrete domains containing a polymeric toughening additive comprising a polyolefin, polyurethane, polyvinyl acetate, polyvinyl alcohol, polytetrafluoroethylene, acrylic resin, polyimide, polyvinyl chloride, polyvinylidene chloride, polystyrene, or a combination thereof; and
the continuous phase containing polylactic acid,
wherein at least one of the discrete domains is elongated in the longitudinal direction of the fiber and has a length of from about 5 to about 400 micrometers and an aspect ratio of from about 3 to about 200, and
wherein the fiber exhibits a peak elongation of about 25% or more and a tenacity of from about 0.75 to about 6 grams-force per denier.

2. The polylactic acid fiber of claim 1, wherein the ratio of the solubility parameter for the polylactic acid to the solubility parameter of the polymeric toughening additive is from about 0.5 to about 1.5.

3. The polylactic acid fiber of claim 2, wherein the polymeric toughening additive has a solubility parameter of from about 15 to about 30 MJoules$^{1/2}$/m$^{3/2}$.

4. The polylactic acid fiber of claim 1, wherein the ratio of the melt flow rate for the polylactic acid to the melt flow rate of the polymeric toughening additive is from about 0.2 to about 8.

5. The polylactic acid fiber of claim 4, wherein the polymeric toughening additive has a melt flow rate of from about 5 to about 150 grams per 10 minutes, determined at a load of 2160 grams at a temperature of 190° C.

6. The polylactic acid fiber of claim 1, wherein the ratio of the Young's modulus of elasticity of the polylactic acid to the Young's modulus of elasticity of the polymeric toughening additive is from about 2 to about 500.

7. The polylactic acid fiber of claim 6, wherein the polymeric toughening additive has a Young's modulus of elasticity of from about 10 to about 200 Megapascals.

8. The polylactic acid fiber of claim 1, wherein the polymeric toughening additive exhibits a peak elongation of from about 100% to about 2000%.

9. The polylactic acid fiber of claim 1, wherein the toughening additive includes a polyolefin.

10. The polylactic acid fiber of claim 9, wherein the polyolefin is a propylene homopolymer, propylene/α-olefin copolymer, ethylene/α-olefin copolymer, or a combination thereof.

11. The polylactic acid fiber of claim 1, wherein the polymeric toughening additive constitutes from about 2 wt. % to about 25 wt. % of the thermoplastic composition and the polylactic acid constitute from about 75 wt. % to about 98 wt. % of the thermoplastic composition.

12. The polylactic acid fiber of claim 1, wherein the thermoplastic composition is generally free of a plasticizer.

13. The polylactic acid fiber of claim 1, wherein the discrete domain has a length of from about 20 micrometers to about 250 micrometers.

14. The polylactic acid fiber of claim 1, wherein the volume content of the domains is from about 3% to about 20% per cubic centimeter of the composition.

15. The polylactic acid fiber of claim 1, wherein the fiber exhibits a tenacity of from about 1.5 to about 4.0 grams-force per denier.

16. A nonwoven web comprising the fiber of claim 1.

17. An absorbent article comprising an absorbent core positioned between a liquid-permeable layer and a generally liquid-impermeable layer, the absorbent article comprising the nonwoven web of claim 16.

18. The polylactic acid fiber of claim 1, wherein the fiber exhibits a peak elongation of from about 40% to about 350%.

19. A method for forming a polylactic acid fiber, the method comprising:
melt blending a polylactic acid with a polymeric toughening additive to form a thermoplastic composition containing a plurality of discrete domains dispersed within a continuous phase,
the discrete domains containing the polymeric toughening additive comprising a polyolefin, polyurethane, polyvinyl acetate, polyvinyl alcohol, polytetrafluoroethylene, acrylic resin, polyamide, polyvinyl chloride, polyvinylidene chloride, polystyrene, or a combination thereof, and
the continuous phase containing the polylactic acid;
extruding the thermoplastic composition through a die; and
drawing the extruded composition to form a fiber,
wherein the domains of the drawn fiber are elongated in a longitudinal direction of the fiber so that the length of the elongated domains is greater than the length of the domains prior to drawing,
wherein at least one of the discrete domains has a length of from about 5 to about 400 micrometers and an aspect ratio of from about 3 to about 200 after drawing,
wherein the fiber exhibits a peak elongation of about 25% or more and a tenacity of from about 0,75 to about 6 grams-force per denier.

20. The method of claim 19, wherein melt blending occurs at a temperature of from about 175° C. to about 220° C. and at an apparent shear rate of from about 100 seconds$^{-1}$ to about 1000 seconds$^{-1}$.

21. The method of claim 19, wherein the draw ratio is from about 200:1 to about 8500:1.

22. The method of claim 19, wherein the draw ratio is from about 1000:1 to about 6000:1.

23. The method of claim 19, wherein the length of the domains before drawing is from about 0.5 to about 20 micrometers.

24. The method of claim 19, wherein the polymeric toughening additive has a solubility parameter of from about 15 to about 30 MJoules$^{1/2}$/m$^{3/2}$.

25. The method of claim 19, wherein the polymeric toughening additive has a melt flow rate of from about 5 to about 150 grams per 10 minutes, determined at a load of 2160 grams at a temperature of 190° C.

26. The method of claim 19, wherein the polymeric toughening additive has a Young's modulus of elasticity of from about 2 to about 500 Megapascals.

27. The method of claim 19, wherein the polymeric toughening additive exhibits a peak elongation of from about 100% to about 2000%.

28. The method of claim 19, wherein the toughening additive includes a polyolefin.

29. The method of claim 19, wherein the polymeric toughening additive constitutes from about 2 wt. % to about 25 wt. % of the thermoplastic composition and the polylactic acid constitute from about 75 wt. % to about 98 wt. % of the thermoplastic composition.

30. A method for forming a nonwoven web, the method comprising:
melt blending a polylactic acid with a polymeric toughening additive to form a thermoplastic composition containing a plurality of discrete domains dispersed within a continuous phase,
the discrete domains containing the polymeric toughening additive comprising a polyolefin, polyurethane, polyvinyl acetate, polyvinyl alcohol, polytetrafluoroethylene, acrylic resin, polyamide, polyvinyl chloride, polyvinylidene chloride, polystyrene, or a combination thereof, and
the continuous phase containing the polylactic acid;
extruding the thermoplastic composition through a die;
drawing the extruded composition to form a fiber,
wherein the domains are elongated in a longitudinal direction of the fiber so that the length of the elongated domains is greater than the length of the domains prior to drawing,
wherein at least one of the discrete domains has a length of from about 5 to about 400 micrometers and an aspect ratio of from about 3 to about 200 after drawing,
wherein the fiber exhibits a peak elongation of about 25% or more and a tenacity of from about 0.75 to about 6 grams-force per denier; and
randomly depositing the fibers onto a surface to form a nonwoven web.

* * * * *